(12) United States Patent
Fischer

(10) Patent No.: US 8,417,760 B2
(45) Date of Patent: Apr. 9, 2013

(54) DEVICE AND METHOD FOR CALCULATING A MULTIPLICATION ADDITION OPERATION AND FOR CALCULATING A RESULT OF A MODULAR MULTIPLICATION

(75) Inventor: Wieland Fischer, Munich (DE)

(73) Assignee: Infineon Technologies AG, Neubiberg (DE)

(*) Notice: Subject to any disclaimer, the term of this patent is extended or adjusted under 35 U.S.C. 154(b) by 1692 days.

(21) Appl. No.: 11/554,174

(22) Filed: Oct. 30, 2006

(65) Prior Publication Data

US 2007/0100926 A1    May 3, 2007

(30) Foreign Application Priority Data

Oct. 28, 2005  (DE) .................... 10 2005 051 772
Jun. 1, 2006   (DE) .................... 10 2006 025 569

(51) Int. Cl.
    *G06F 7/52*   (2006.01)
(52) U.S. Cl. .............. 708/620; 708/490; 708/523
(58) Field of Classification Search .................. None
    See application file for complete search history.

(56) References Cited

U.S. PATENT DOCUMENTS

| | | | |
|---|---|---|---|
| 4,281,391 A | 7/1981 | Huang | |
| 4,870,681 A | 9/1989 | Sedlak et al. | |
| 5,073,870 A | 12/1991 | Morita | |
| 6,182,104 B1 * | 1/2001 | Foster et al. | 708/501 |
| 6,185,596 B1 * | 2/2001 | Hadad et al. | 708/491 |
| 7,185,039 B2 | 2/2007 | Grinchuk | |
| 2005/0038845 A1 | 2/2005 | Fischer | |
| 2005/0149595 A1 | 7/2005 | Fischer et al. | |
| 2005/0149597 A1 | 7/2005 | Fischer et al. | |
| 2006/0010192 A1 | 1/2006 | Fischer et al. | |
| 2006/0064453 A1 | 3/2006 | Fischer et al. | |
| 2006/0179105 A1 | 8/2006 | Hubert | |

FOREIGN PATENT DOCUMENTS

| | | |
|---|---|---|
| AU | 2003224137 | 11/2003 |
| DE | 36 31 992 | 11/1987 |
| DE | 102 05 713 C1 | 8/2003 |
| DE | 102 19 158 A1 | 11/2003 |
| DE | 102 19 161 A1 | 11/2003 |
| DE | 102 19 164 A1 | 11/2003 |
| DE | 102 60 655 B3 | 6/2004 |
| DE | 102 60 660 B3 | 6/2004 |
| EP | 1 515 226 A2 | 3/2005 |

OTHER PUBLICATIONS

Menezes, A., et al.; "Handbook of Applied Cryptography"; Section 14.5, pp. 610-613, 1996.

(Continued)

*Primary Examiner* — Michael D Yaary
(74) *Attorney, Agent, or Firm* — Schiff Hardin LLP

(57) ABSTRACT

For calculating a result of a modular multiplication with long operands, at least the multiplicand is divided into at least three shorter portions. Using the three shorter portions of the multiplicand, the multiplier and the modulus, a modular multiplication is performed within a cryptographic calculation, wherein the portions of the multiplicand, the multiplier and the modulus are parameters of the cryptographic calculation. The calculation is performed sequentially using the portions of the multiplicand and using an intermediate result obtained in a previous calculation, until all portions of the multiplicand are processed, to obtain the final result of the modular multiplication. The calculation of an intermediate result is performed using a multiplication addition operation, in which MMD operations and updating operations are performed sequentially, and short auxiliary registers and short result registers are used.

36 Claims, 29 Drawing Sheets

OTHER PUBLICATIONS

Fischer et al.; "Increasing the Bitlength of a Crypto-Coprocessor"; Proc. of CHES '02, Springer LNCS, vol. 2523, pp. 71-81, 2002.

Fischer et al.; "Unfolded modular multiplication"; Proc. of ISAAC '03, Springer LNCS, 2003.

Menezes, A. et al.; "Handbook of Applied Cryptography"; CRC Press, 1997.

Montgomery; "Modular Multiplication Without Trial Division"; Mathematics of Computation, vol. 44, No. 170, Apr. 1985, pp. 519-521.

Sedlak; "The RSA Cryptography Processor: The first High Speed One-Chip Solution"; Proc. of EUROCRYPT '87, Springer LNCS, vol. 293, pp. 95-105.

Bosselaers, A. et al.; "Comparison of three modular reduction functions"; Advances Cryptology—CRYPTO '93, Lecture Notes in Computer Science, vol. 773, pp. 1-12.

Koc, C.K. et al.; "Fast algorithm for modular reduction"; IEE Proc.—Comput. Digit. Tech. vol. 145, No. 4, Jul. 1998, pp. 265-271.

Walter, C.; "Faster Modular Multiplication by Operand Scaling"; Advances in Cryptology—CRYPTO '91, Lecture Notes in Computer Science, vol. 576, pp. 313-323.

Hars, Laszlo; "Long Modular Multiplication for Cryptographic Applications"; CHES 2004—Lecture Notes in Computer Science, vol. 3156, 2004, (http://www.hars.us/Papers/ModMult.pdf).

Nedjah, Nadia; "A Review of Modular Multiplication Methods and Respective Hardware Implementations"; Informatica, vol. 30, Nr. 1, The Slovene Society Informatika, Ljubljana, Slovenien, 2006, pp. 111-129.

* cited by examiner $B = B_0 + B_1 \cdot Z + B_2 \cdot Z^2; \; Z = 2^i$ generally:
$A_0 = A \bmod Z;$
$A_1 = [A \text{ div } Z] \bmod Z;$
$A_2 = A \text{ div } Z^2$

FIG 1C $C = A \cdot B \bmod N$;

$C = [(A \cdot B_2 \bmod N) \cdot Z + A \cdot B_1 \bmod N] \cdot Z + A \cdot B_0 \bmod N$ (for $B_0$, $B_1$, $B_2$, only short registers are required)

FIG 1D modular multiplication $MM_{3k}$
input: $N = (N_2 | N_1 | N_0)_Z \in \left[\frac{2}{3} Z^3, Z^3\right[$
$A = (A_2 | A_1 | A_0)_Z \in [0, N[$
$B = (B_2 | B_1 | B_0)_Z \in [0, N[$
output: $A \cdot B \bmod N \in [0, N[$ $C := MMA_Z(A, B_2, 0; N) - N$
$C := MMA_Z(A, B_1, C; N) - N$
$C := MMA_Z(A, B_0, C; N)$
return $C$

FIG 1E modular multiplication with addition $MMA_Z$
input: $N \in \left[\frac{2}{3} Z^3, Z^3\right[$
$A \in [0, N[$
$B_i \in [0, Z[$
$C \in [-N, 0]$
output: $A \cdot B_i + C \cdot Z \bmod N \in [0, N[$ multiplication with addition $MA_Z$ input:   $A \in [0, N[$
         $B_i \in [0, Z[$
         $C \in [-N, 0]$
output:  $D := A \cdot B_i + C \cdot Z \in [-NZ, NZ[$ reduction $Red_Z$ input:   $D \in [-NZ, NZ[$
         $N \in \left[\frac{2}{3}Z^3, Z^3\right[$
output:  $D \bmod N \in [0, N[$ encryption:
$C = M^e \bmod N$ decryption:
$M = C^d \bmod N$ signature:
$S = M^d \bmod N$ verification:
$M = S^e \bmod N$ C: encrypted data
M: unencrypted data
S: signature
d: private key
e: public key
N: modulus (public)

FIG 2C

$M_{mk}$ input: $A = (A_{m-1}, ..., A_0)_Z$
$\quad\quad\quad B = (B_{m-1}, ..., B_0)_Z$
output: $C := A \cdot B$ $C = (C_{2m-1}, ..., C_0)_Z := 0$
for $i := 0$ to $m-1$ do
$\quad$ for $j := 0$ to $m-1$ do
$\quad\quad (C_{i+j+1} | C_{i+j})_Z := (C_{i+j+1}, C_{i+j})_Z + M_K(A_i, B_j)$
$\quad$ end;
end;
return $C$

FIG 2D

$MA_K$ input: $A, B, C \in [0, 2^K[$
output: $A \cdot B + C \cdot 2^K$

MULT ADD operation

FIG 2E

$MMA_K$ input: $N \in [2^{K-1}, 2^K[$
$\quad\quad\quad B \in [0, 2^K[$
$\quad\quad\quad A, C \in [0, N[$
output: $A \cdot B + C \cdot 2^K \bmod N$ MULT MOD ADD operation

FIG 2F

$MM_K$ input: $N \in [2^{K-1}, 2^K[$
$\quad\quad\quad A, B \in [0, N[$
output: $A \cdot B \bmod N$ modular multiplication

FIG 2G

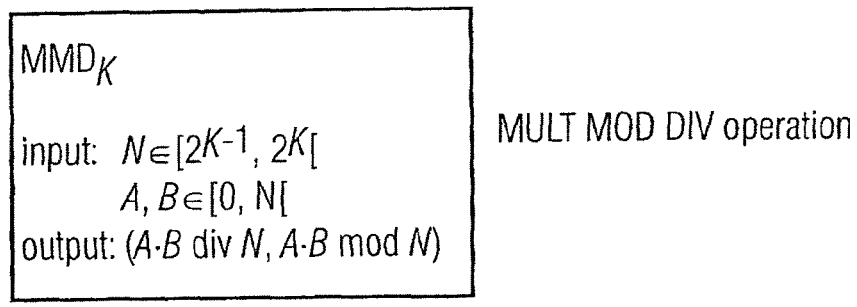

MULT MOD DIV operation $MMD_K$ input: $N \in [2^{K-1}, 2^K[$
$A, B \in [0, N[$
output: $(A \cdot B \text{ div } N, A \cdot B \text{ mod } N)$

FIG 3A Mult Add operation (only short operands)

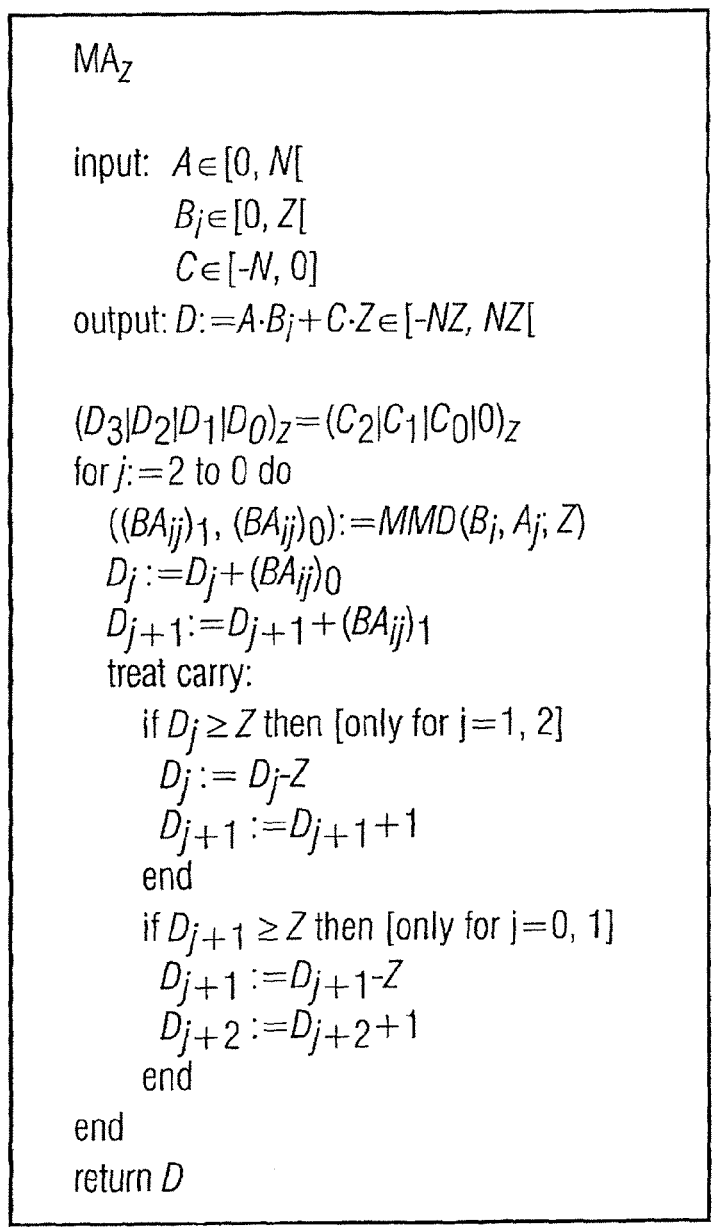

$MA_Z$ input: $A \in [0, N[$
$B_j \in [0, Z[$
$C \in [-N, 0]$
output: $D := A \cdot B_j + C \cdot Z \in [-NZ, NZ[$ $(D_3|D_2|D_1|D_0)_Z = (C_2|C_1|C_0|0)_Z$
for $j := 2$ to $0$ do
   $((BA_{ij})_1, (BA_{ij})_0) := MMD(B_j, A_j; Z)$
   $D_j := D_j + (BA_{ij})_0$
   $D_{j+1} := D_{j+1} + (BA_{ij})_1$
   treat carry:
     if $D_j \geq Z$ then [only for $j = 1, 2$]
       $D_j := D_j - Z$
       $D_{j+1} := D_{j+1} + 1$
     end
     if $D_{j+1} \geq Z$ then [only for $j = 0, 1$]
       $D_{j+1} := D_{j+1} - Z$
       $D_{j+2} := D_{j+2} + 1$
     end
end
return $D$

FIG 3B

Red$_Z$ (base version)

input: $D \in [-NZ, NZ[$
$N \in \left[\frac{2}{3}Z^3, Z^3\right[$ output: $D \mod N \in [0, N[$ $Q_0 := D \text{ div } N$
$E := D - Q_0 \cdot N$ return $E$

FIG 3C

Red$_Z$ (1st version)

input: $D \in [-NZ, NZ[$
$N \in \left[\frac{2}{3}Z^3, Z^3\right[$ output: $D \mod N \in [0, N[$ $\tilde{Q}_0 := D_3 Z \text{ div } N_2$
evaluate $\varepsilon$
$Q_0 := \tilde{Q}_0 + \varepsilon$
$E := D - Q_0 \cdot N$ return $E$

FIG 3D

Red$_Z$ (2nd version)

input: $D \in [-NZ, NZ[$
$N \in \left[\frac{2}{3}Z^3, Z^3\right[$ output: $D \bmod N \in [0, N[$ $\widetilde{Q}_0 := D_3 Z \text{ div } N_2$
estimate $\varepsilon$ by $\widetilde{\varepsilon}$
$Q'_0 := \widetilde{Q}_0 + \widetilde{\varepsilon}$
$E := D - Q'_0 \cdot N$
if $E \geq N$ then
    $E := E - N$
else if $E < 0$ then
    $E := E + N$
end return $E$

FIG 3E

Red$_Z$ (3rd version)

input: $D \in [-NZ, NZ[$
$N \in \left[\frac{2}{3}Z^3, Z^3\right[$ output: $D \bmod N \in [0, N[$ $(\widetilde{Q}_0, \widetilde{R}_0) := \text{MMD}(D_3, Z; N_2)$
    estimate $\varepsilon$:
$\widetilde{\varepsilon} := (D_2 + \widetilde{R}_0 - (\widetilde{Q}_0 N_1)_1) \text{ div } N_2$
$Q'_0 := \widetilde{Q}_0 + \widetilde{\varepsilon}$
$E := D - Q'_0 \cdot N$
if $E \geq N$ then
    $E := E - N$
else if $E < 0$ then
    $E := E + N$
end return $E$

FIG 3F

Red$_Z$ (4th version)

input: $D \in [-NZ, NZ[$
$N \in \left[\frac{2}{3}Z^3, Z^3\right[$ output: $D \bmod N \in [0, N[$ $(\tilde{Q}_0, \tilde{R}_0) := \text{MMD}(D_3, Z-N_2; N_2)$
$Q_0 := \tilde{Q}_0 + D_3$
$D_2 := D_2 + \tilde{R}_0$
$\tilde{\varepsilon} := \text{estimate } [D_2 - (\tilde{Q}_0 N_1)_1 \text{ div } N_2]$
$D_2 := D_2 - \tilde{\varepsilon} N_2$
$Q'_0 := \tilde{Q}_0 + \tilde{\varepsilon}$
$((Q'_0 N_0)_1, (Q'_0 N_0)_0) := \text{MMD}(Q'_0, N_0; Z)$
$D_0 := D_0 - (Q'_0 N_0)_0$
treat borrow/carry
$D_1 := D_1 - (Q'_0 N_0)_1$
treat borrow/carry
$((Q'_0 N_1)_1, (Q'_0 N_1)_0) := \text{MMD}(Q'_0, N_1; Z)$
$D_1 := D_1 - (Q'_0 N_1)_0$
treat borrow/carry
$D_2 := D_2 - (Q'_0 N_1)_1$
treat borrow/carry
$E := D$
if $E \geq N$ then
    $E := E - N$
else if $E < 0$ then
    $E := E + N$
end return $E$ long mode — short mode

FIG 4E

| | algorithm I | algorithm II | algorithm III |
|---|---|---|---|
| $mm_K$: theoretical | $18mmd_K + 3mm_k + 9mov_k$ | $7mmd_K + 16mov_k$ | $18mmd_K + 6mov_k$ |
| $k$ | $k = \lceil \frac{K}{3} \rceil$ | $k \approx \lceil \frac{K}{2} \rceil$ | $k = \lceil \frac{K}{3} \rceil + 4$ |
| Xmemory/bit needed | $9k$ | $8k$ | $8k$ |
| K=2048: | | | |
| $k$ | 683 | 1024 | 687 |
| $mm_K$/au | 7263 | 10114 | 5994 |
| full exponentiation/au | 22.3 M | 31.0 M | 18.4 M |
| K=2048+16: | | | |
| $k$ | 688 | 1052 | 692 |
| $mm_K$/au | 7452 | 10254 | 6660 |
| full exponentiation/au | 22.9 M | 31.5 M | 20.4 M |
| K=1536: | | | |
| $k$ | 512 | 768 | 516 |
| $mm_K$/au | 5514 | 7660 | 4482 |
| full exponentiation/au | 12.7 M | 17.6 M | 10.3 M |
| K=2752: | | | |
| $k$ | - | 1377 | - |
| $mm_K$/au | - | 19668 | - |
| full exponentiation/au | - | 81.1 M | - | algorithm I: Montgomery multiplication
algorithm II: Fischer-Sedlak-Seifert multiplication
algorithm III: new algorithm according to invention

- below 2064 bits: algorithm III is the fastest one
- above 2065 bits: only algorithm II still works
- algorithm III requires the fewest external memory (X memory)

FIG 6A

MM$_{3k}$ input: $N = (N_2|N_1|N_0)_Z$ with $N_2 \in [\frac{2}{3}Z, Z[$ $A = (A_2|A_1|A_0)_Z \in [0, N[$
$B = (B_2|B_1|B_0)_Z \in [0, N[$ output: $A \cdot B \mod N \in [0, N[$ $C := \text{MMA}'_Z(A, B_2, 0; N)$
$C' := \text{MMA}'_Z(A, B_1, C; N)$
$E := \text{MMA}_Z(A, B_0, C'; N)$ return $E$

FIG 7A

```
MMA_Z input:   $N = (N_2 | N_1 | N_0)_Z$ with $N_2 \in [\frac{2}{3}Z, Z[$
         $A = (A_2 | A_1 | A_0)_Z \in [0, N[$
         $B_j \in [0, Z[$
         $C \in [-N, 0]$
output: $A \cdot B_j + C \cdot Z \bmod N \in [0, N[$ $D := MA_Z(A, B_j, C)$
$E := Red_Z(D; N)$ return $E$
```

FIG 7B

```
MMA'_Z input:   $N = (N_2 | N_1 | N_0)_Z$ with $N_2 \in [\frac{2}{3}Z, Z[$
         $A = (A_2 | A_1 | A_0)_Z \in [0, N[$
         $B_j \in [0, Z[$
         $C \in [-N, 0[$
output: $A \cdot B_j + C \cdot Z \bmod N \in [-N, 0[$ $D := MA_Z(A, B_j, C)$
$E := Red'_Z(D; N)$ return $E$
```

$MA_Z$
input: $A = (A_2|A_1|A_0)_Z \in [0, N[$
$B_j \in [0, Z[$
$C = (C_2|C_1|C_0)_Z \in [-N, 0]$
i.e., $C_2 \in [-N_2-1, N_2]$
output: $D := A \cdot B_j + C \cdot Z \in [-NZ, NZ[$ $(U_1, U_0) := MMD(B_j, A_2; Z)$
$(D'_3|D'_2)_Z := (C_2+U_1, C_1+U_0)_Z$
$(V_1, V_0) := MMD(B_j, A_1; Z)$
$(D''_2|D'_1)_Z := (D'_2+V_1, C_0+V_0)_Z$
$(W_1, W_0) := MMD(B_j, A_0; Z)$
$(D'''_1|D_0)_Z := (D'_1+W_1, W_0)_Z$
$(D_3|D_2|D_1|D_0)_Z := (D'_3, D''_2, D'''_1, D_0)_Z$ return $D$ D0: MOD result of the last MMD operation D3, D2, D1: updated MOD-DIV results of the three MMD operations

FIG 8E
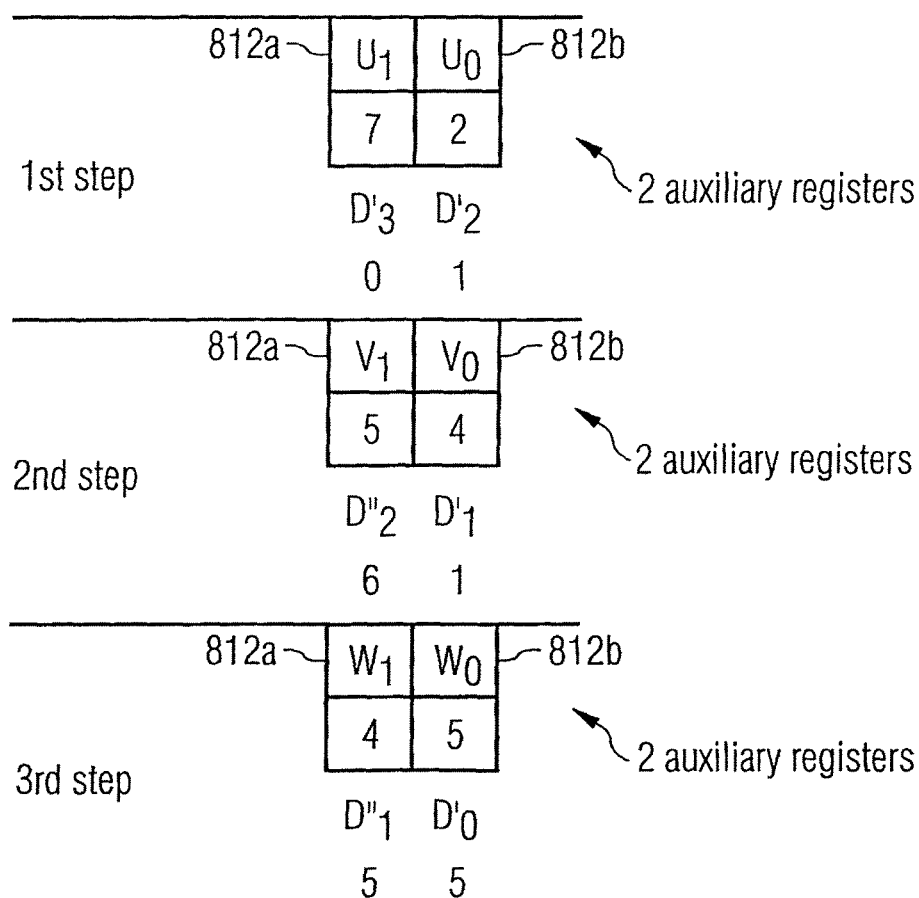
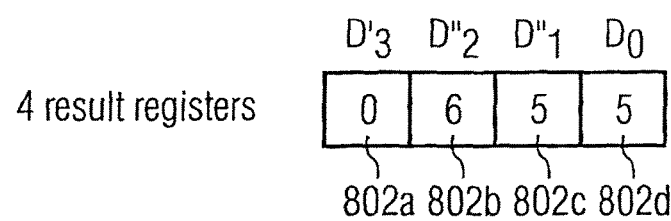

FIG 9A

```
TC input:  (Y, X)_Z, X ∈ [0, 2Z[
output: (Y|X)_Z if (X ≥ Z) then
    X := X-Z
    Y := Y+1
end return (Y, X)
```

FIG 9B

```
TB input:  (Y, X)_Z, X ∈ [-Z, Z[
output: (Y|X)_Z if (X < 0) then
    X := X+Z
    Y := Y-1
end return (Y, X)
```

FIG 9C $\text{Red}_Z^{[r]}$ input: $N = (N_2|N_1|N_0)_Z$ with $N_2 \in [\frac{2}{3}Z, Z[$ $D = (D_3|D_2|D_1|D_0)_Z \in [-NZ, NZ[$ output: $D \bmod N \in [0, N[$ output': $D \bmod' N \in [-N, 0[$ 184a $\begin{cases} (Q_0, R_0) := \text{MMD}(D_3, Z-N_2; N_2) \\ Q'_0 := Q_0 + D_3 \\ D'_2 := D_2 + R_0 \end{cases}$ 184b $\{ \varepsilon := \text{estimate } (D'_2 - (Q'_0 N_1)_1 \text{ div } N_2)[+1]$ 184c $\begin{cases} D''_2 := D'_2 - \varepsilon N_2 \\ Q''_0 := Q'_0 + \varepsilon \end{cases}$ 186a $\begin{cases} (U_1, U_0) := \text{MMD}(Q''_0, N_0; Z) \\ (D'_1|D'_0)_Z := (D_1-U_1, D_0-U_0)_Z \\ (V_1, V_0) := \text{MMD}(Q''_0, N_1; Z) \\ (D'''_2|D''_1)_Z := (D''_2-V_1, D'_1-V_0)_Z \end{cases}$ 186b $\{ (E_2|E_1|E_0)_Z := (D'''_2, D''_1, D'_0)_Z \bmod [r] N$ return $E$

FIG 9D
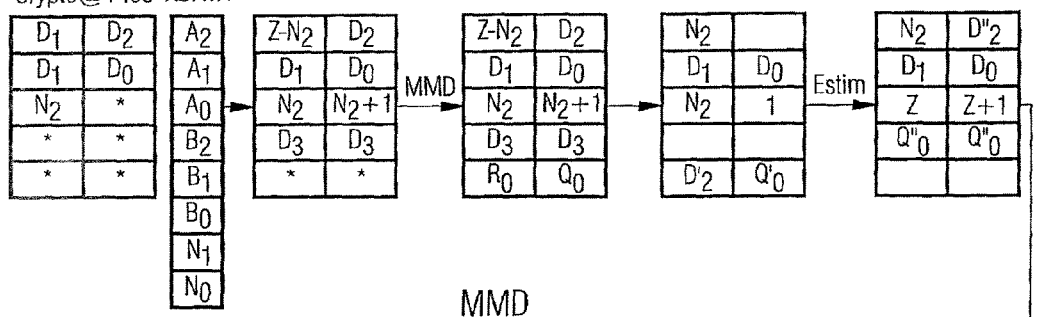
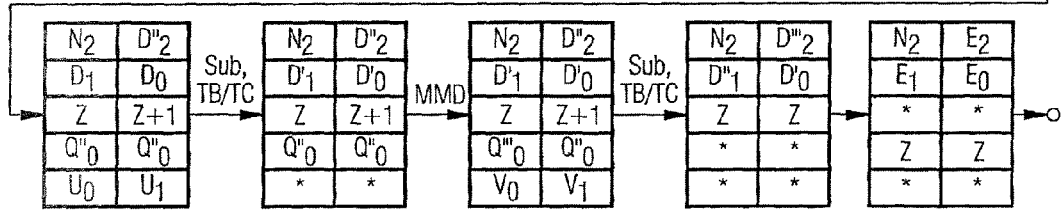
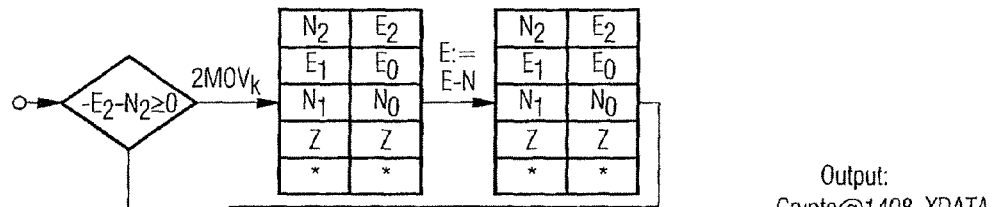
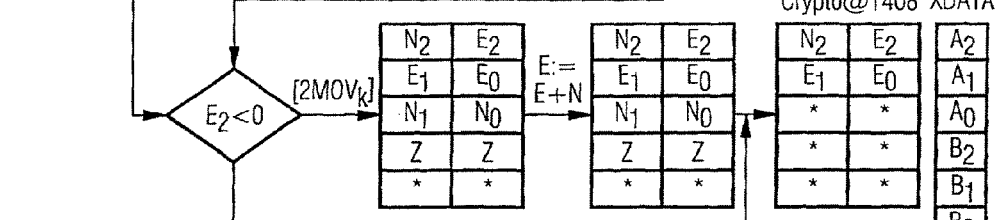
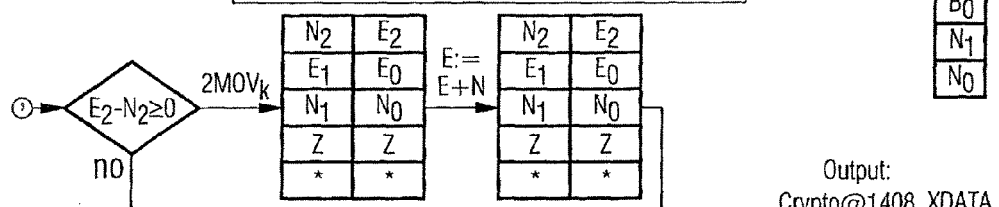
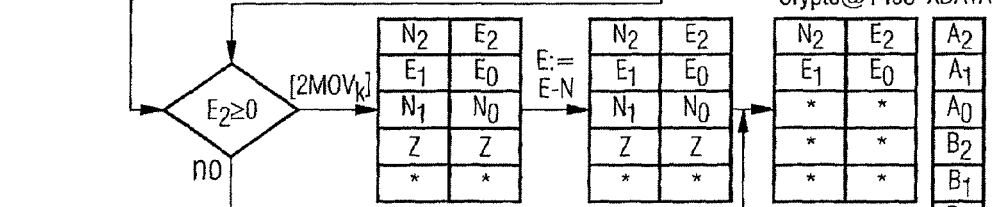

```
MMD input:  N
        X ∈ [0, N[
        Y ∈ [0, N[
output: (Q, R) := (X·Y div N, X·Y mod N)

R := MM(X, Y; N)
Q' := MM(X, Y; N+1)
Q := R-Q' mod (N+1)

return (Q, R)
```

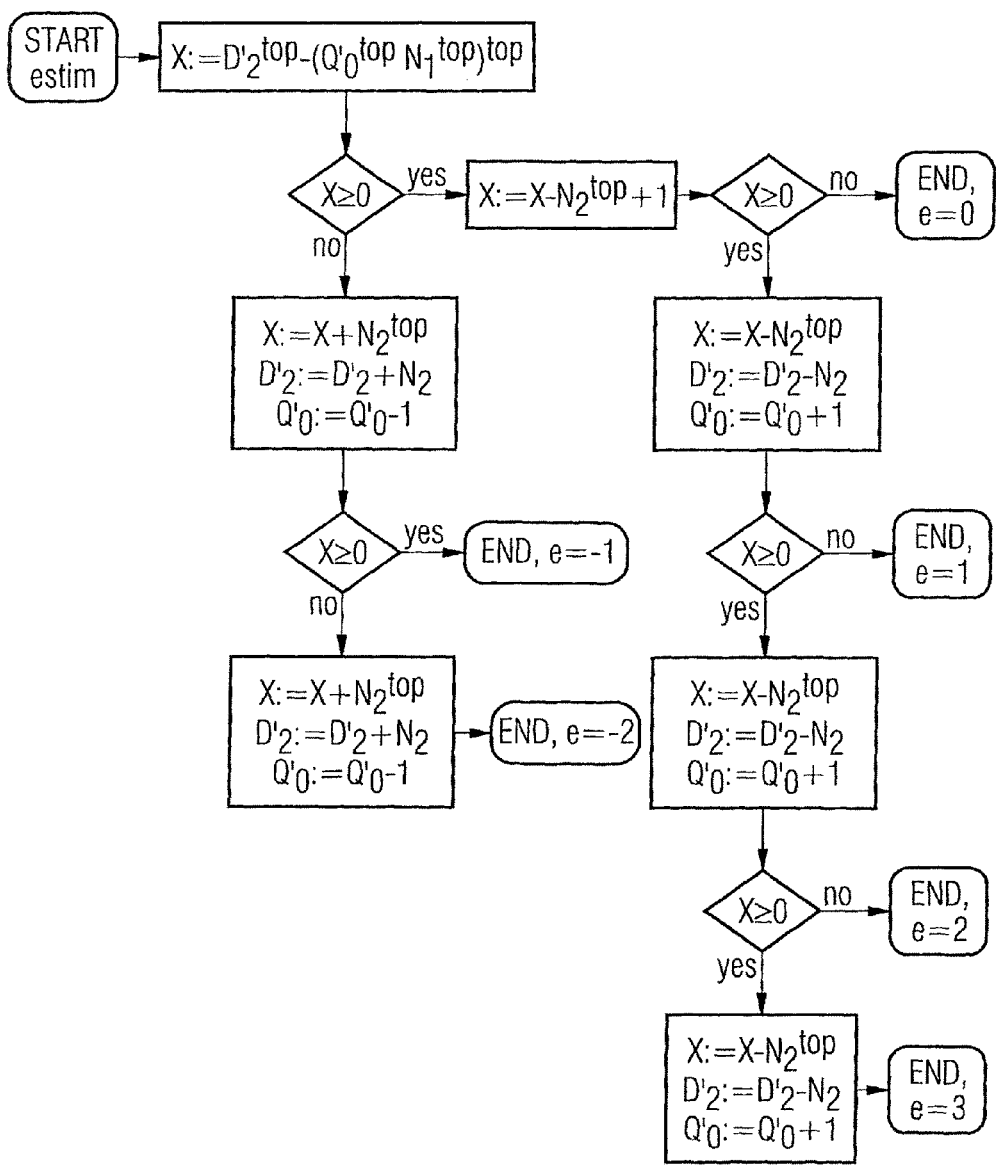

FIG 13A

```
input:  N* = (N*₂|N*₁|N*₀)_W
output: (N'₂|N'₁|N'₀)_Z = N*

(Q₁, R₁) := MMD(N*₂, W; Z)
(Q₂, R₂) := MMD(Q₁, W; Z)
(Q₃, R₃) := MMD(R₁, W; Z)
(N'₂|N'₁|N'₀)_Z := (Q₂, R₂+Q₃, R₃+N*₀)_Z
(Q₄, R₄) := MMD(N*₁, W; Z)
(N'₂|N'₁|N'₀)_Z := (N'₂, N'₁+Q₄, N'₀+R₄)_Z return (N'₂|N'₁|N'₀)_Z
```

FIG 13B

```
Div input:  X, Y with X < Y²
output: X div Y = ⌊X/Y⌋

R  := X mod Y
R' := X mod (Y+1)
Q  := R - R'
if Q < 0 then
    Q := Q + Y + 1
end return Q
```

FIG 13C

```
input:  A = (A_2|A_1|A_0)_z,
        N* = (N'_2|N'_1|N'_0)_z
output: (A'_2|A'_1|A'_0)_z := A mod N*

Q := Div(A_2, N'_2+1)
(M_2|M_1|M_0) := MA((N'_2|N'_1|N'_0)_z, Q, 0)
(A'_2|A'_1|A'_0)_z := (A_2-M_2, A_1-M_1, A_0-M_0)_z
if A'_2 < 0 then
    (A'_2|A'_1|A'_0)_z := (A'_2+N_2, A'_1+N_1, A'_0+N_0)_z
end return (A'_2|A'_1|A'_0)_z
```

DEVICE AND METHOD FOR CALCULATING A MULTIPLICATION ADDITION OPERATION AND FOR CALCULATING A RESULT OF A MODULAR MULTIPLICATION

CROSS-REFERENCE TO RELATED APPLICATIONS

This application claims priority from German Patent Applications No. 10 2006 025 569.0, filed on Jun. 1, 2006, and No. 10 2005 051 772.2, filed on Oct. 28, 2005, which are incorporated herein by reference in their entirety.

BACKGROUND

The present invention relates to the calculation of the modular multiplication, such as it is required, in particular, in cryptographic applications, and particularly to a calculation of the modular multiplication with operands having a larger number of digits than bit slices are present in a long number calculating unit.

The modular multiplication is a central operation used in modular exponentiation, such as it is usually used in cryptography. For example, as shown in FIG. 2a, a key pair is generated in public key cryptography, i.e. in asymmetric cryptography, such as in the RSA method. The key pair consists of a public key e and a private key d. The private key is only known to one entity. The public key serves this entity, but is provided to another entity which wants to send, for example, encrypted data to the one entity to which the private key belongs. As shown in FIG. 2a, an encryption of an unencrypted message M to an encrypted message C is done by calculating a so-called modular exponentiation, in which the message is raised to a higher power with the public key, to then perform a modular reduction with respect to the modulus N, which is also known publicly. For the decryption, the same operation is performed, but now with the private key as exponent, so that the one entity to which the private key belongs and by which the public key was originally distributed to the other entity, again obtains the plain text message M.

These public key methods may also be used as signature/verification methods. An entity generates a digital signature by encrypting the message M to be signed with the private key of this entity to generate the signature S, such as it is also illustrated in FIG. 2a. The verification is then done by the verifying entity subjecting the signature to modular exponentiation with the public key e of the signing entity to then obtain a plain text message M that may be compared to the plain text message M to which the signature is assigned. If the plain text message obtained in the verification matches the plain text message to which the signature is assigned, it may be assumed that the signed document is authentic.

As mentioned above, a cryptographic calculation including modular exponentiation, such as illustrated in FIG. 2b, is split into several modular multiplications. For example, it is usually preferred to calculate a modular exponentiation by applying modular multiplications consecutively. In particular, due to the increased security requirements for the RSA algorithm, there is an interest to execute a modular multiplication with a width of 2048 bits, i.e. with key lengths and/or modulus lengths of 2048 bits.

Generally in modular multiplication as part of a cryptographic calculation, both the multiplier A and the multiplicand B and the modulus N represent parameters of the cryptographic calculation, because the final results, such as plain text message, encrypted message, signature, etc. depend on these parameters.

As already mentioned, there is an interest to steadily increase the key lengths of public key cryptography, because this allows to still prevent so-called brute force attacks with increasingly fast processors. For example, the effort of a brute force attack is correlated with the key length, so that increasingly long keys also require increasingly more complex brute force attacks which, with currently available computers, take so much time that a cryptographic algorithm may be considered to be safe. However, what is problematic with increasingly larger key lengths is that the key length that a crypto co-processor in a chip card or a computer (for example in a TPM module) has is limited by the long number calculating unit included in this crypto co-processor. Such a long number calculating unit is shown, for example, in FIG. 4c, where a so-called bit-slice structure of a long number calculating unit is illustrated.

In the embodiment shown in FIG. 4c, each bit slice includes an arithmetic unit, which may, for example, be a one-bit full adder, which may receive a carry from a lower bit slice and which may output a carry to a higher bit slice. Furthermore, at least one register is associated with such a bit slice. However, it is preferred to associate a certain number of registers, for example two or, even better, for example five registers. In a currently existing crypto co-processor with a bit slice number of 1408 slices, a bit slice includes five registers, i.e. register Z, register C, register N, register $CR_0$ and register $CR_4$, as indicated in the left subimage in FIG. 4a. In that case, this processor operates in long mode. With this number of bit slices, the processor is well-suited to perform RSA calculations with key lengths of 1024 bits, because, for a calculation with 1024 bits key length, a calculating unit that would also have only 1024 bit slices would not be quite sufficient. In the calculating unit with 1408 bit slices, slightly longer key lengths may also be calculated, but there should always be slightly more bit slices than key bits to be able to compensate certain overflow or underflow situations.

The calculating unit 40 shown in FIG. 4b may be provided with data and/or flow sequences and/or controlled by a controller 41. Furthermore, there is a register configuration means 42 which may configure the registers of the calculating unit, i.e. the five registers in long mode in this embodiment, to ten registers in short mode. Each long mode register of a certain length thus results in two short registers of half the length, respectively, in this embodiment, so that two N registers, two C registers, two Z registers and one $CR_0$ register, one $CR_2$ register, one $CR_4$ register and one $CR_6$ register are created. Still each bit slice has an arithmetic unit, i.e. for example a one-bit full adder, which now, however, has twice the number of registers in short mode in contrast to the situation in FIG. 4c representing the long mode.

If the crypto co-processor with 1408 bits now is to calculate RSA key lengths of, for example, 2048 bits, this is no longer easily possible, because there are not enough bit slices.

It is apparent that, although an increase in key lengths is very desirable from the security point of view, each increase in key lengths causes already existing coprocessors to be no longer readily usable. Thus, always new longer calculating units would have to be developed, which requires development time and costs.

In order to avoid this, methods have been developed with which larger numbers may be processed on smaller calculating units. For example, there are generally methods for doubling a calculating unit in software. Such a method is, for example, the calculation of the modular multiplication using the Chinese Remainder Theorem (CRT), as it is described in section 14.5 on pages 610-613 of "Handbook of Applied Cryptography", A. Menezes, P. van Oorschot, S. Vanstone, 1996. Generally, a modular exponentiation with a long modulus is split into two modular exponentiations with a short modulus using the Chinese remainder theorem, wherein these results are then combined. In that way, a calculating unit may, so to speak, be doubled "software-wise".

However, this concept only allows doubling, which is inconvenient for situations in which doubling of the key lengths is not necessarily required, but in which key lengths are to be used that are maybe only 50% larger than the architectural calculating unit length, i.e. the number of bit slices. If such 100% doubling algorithms are used, when perhaps only key lengths larger by 50% are to be processed, the calculating unit is used only with (100+50) %/2=75%. In principle, hardware resources are thus wasted.

In addition to the CRT doubling method, there are also further calculating unit doubling algorithms, such as the Montgomery multiplication, a multiplication with Karatsuba-Offman and subsequent reduction by means of, for example, the Barrett reduction, or the doubling method using the MultModDiv operation, such as it is, for example, discussed in German patent DE 10219158 B4.

Considering, for example, FIG. 4$d$, a calculating unit for a 1024 bit key length is indicated at 43. Software doubling using, for example, the Chinese remainder theorem or using one of the above further methods, is useful when 2048 bits are required, such as illustrated in block 44 in FIG. 4$d$. In this way, the whole calculating unit is used, i.e. no unused bit slices remain. However, if a key length with, for example, 1536 bits is to be enough, software doubling using, for example, the Chinese remainder theorem (CRT) will result in 2×768 bits being required. The remaining 2×256 bits would remain unused in this case.

Conventionally, there is thus a lack of an alternative calculating unit extension concept by which more flexible key lengths and thus a more flexible calculating unit utilization may be achieved.

BRIEF SUMMARY

Among other things, the present invention provides a method and/or a device for calculating the result of a multiplication addition operation between a first operand, a second operand, a third operand and a fourth operand, wherein the first and third operands are longer than the second operand or the fourth operand, and wherein portions of the first operand are equal to or shorter than the fourth operand, with means for calculating results of an MMD operation using the second operand, a more significant portion of the first operand and the fourth operand as modulus, and for storing a DIV result in a first auxiliary register and an MOD result in a second auxiliary register; means for updating the DIV result and the MOD result using an addition of at least one portion of the third operand and for storing updated results in a fourth result register and a third result register; and means for executing again the MMD operation and the updating using another portion of the first operand, until all portions of the first operand are processed, wherein result registers in which updated results of an MMD operation are stored and a register in which an MOD result of a last MMD operation is stored together represent the result (802).

The present invention is based on the finding that at least the multiplicand is divided into at least three portions, wherein each portion comprises a number of digits less than half the number of digits, wherein the at least three portions of the multiplicand include all digits of the multiplicand. Furthermore, means for sequentially calculating is provided to sequentially calculate an intermediate result for each portion of the multiplicand, and to then obtain a result of the modular multiplication using these intermediate results.

By splitting the multiplicand into at least three portions, a dividable calculating unit may preferably be used, in which the multiplicand and preferably also the multiplier and the modulus are divided into three or more parts, so that each third of the number can be accommodated in one half of the co-processor. Thus, the calculating unit itself may also be utilized in its full length, and no hardware resources are wasted.

In preferred embodiments, a division of all registers of the calculating unit is done, namely into registers of the same length, and furthermore all operands, i.e. both the multiplier and the multiplicand and the modulus, are also divided into three or more parts, so that in the end, for calculating the (long) modular multiplication, there are only required logic and arithmetic operations that are done with numbers whose length, i.e. whose number of digits, is maximally equal to the number of digits of a portion of the numbers. Preferably, in order to obtain optimum utilization of a calculating unit, the portion into which a number is divided, i.e. the number of bit slices of the calculating unit that has to perform these operations with a smaller number of digits, is selected such that they correspond to one half of the dividable calculating unit.

According to the invention, a calculating method using the MultModDiv operation is used, in which there are preferably never used more than ten short registers of the calculating unit, wherein two short registers of the calculating unit in short mode correspond to one register of the calculating unit in long mode.

In particular, in order to calculate the modular multiplication, the whole task is divided into three multiplication modulus addition operations to be performed sequentially in the present invention, wherein another portion of the multiplicand B is used for each one of these individual operations. Each such multiplication modulus addition operation is, in turn, divided into a multiplication addition operation and a subsequent reduction operation, wherein, in the multiplication addition operation, there is always used the currently considered portion of the multiplicand B, and in individual iteration steps, corresponding portions of the intermediate result C obtained from the previous step and the multiplier A are used.

According to the invention, this multiplication addition operation is now divided into several MultModDiv operations, i.e. into modular multiplications, which respectively provide the integer quotient, i.e. the DIV result, and the remainder, i.e. the MOD result. Both the DIV result and the MOD result are short numbers that may be stored in short registers. The short registers in which results of the MMD operation are stored are also referred to as auxiliary registers, because they are written to several times in the process of the iterative processing of the multiplication addition operation. In other words, the results of an MMD operation are only required for the subsequent updating operation, in which a piece of the result number, namely a portion of the result number fitting into a short register, is successively calculated. Specifically, during updating, the result of the previous MMD operation is updated using an addition of portions of the third operand C, i.e. the intermediate result of a previous step.

According to the invention, each updating step provides two entries into a result register, wherein the more significant entry into the result register already represents a final result that is not changed anymore, while the less significant entry of the two obtained results will still be changed by a result of an updating step depending on the current number situation.

The present invention thus only needs a calculating unit for a multiplication addition operation that has a word width equal to the length of only one portion and not the whole length of an operand, i.e. which has a short word width. In other words, such a calculating unit only requires internal registers of short length and not of long length. In addition, only in a preferred embodiment of the present invention only two auxiliary registers and—for a division into three portions—four short result registers are required. The multiplication addition operation may thus be calculated with only six short registers. In this case, the calculating unit is a bit slice stack, wherein each bit slice has a full adder function, i.e. receives a carry from a lower bit slice and passes a carry on to a higher bit slice, wherein "higher" and "lower" refers to the significance and/or valency of the processed binary digits. If there is only a calculating unit with six internal registers, the calculating unit must be able to receive the additional operands from an external memory, i.e. the portions of the intermediate result from a previous iteration step and the required portions of the multiplier A and, if necessary, the current portion of the multiplicand B.

In the preferred embodiment of the present invention, a number of 10 or 12 short registers is sufficient for calculating the multiplication addition operation, which may be obtained by halving five or six long registers, wherein there is further available a working memory, which is typically called "XDATA", in which further portions are stored. This working memory, however, only has to be accessed with respect to a single portion of a single operand in each cycle, so that an operation may be efficient and with a small number of working memory accesses, but with maximum utilization of the internal registers. It is to be noted that the inventive concept of calculating the result of a multiplication addition operation may be used not only as part of a modular multiplication, but in all cases where, using a processor allowing only short word lengths due to its construction, a multiplication addition operation is to be calculated that includes long operands, i.e. operands having a word length that may not be processed by the calculating unit in one go.

BRIEF DESCRIPTION OF THE SEVERAL
VIEWS OF THE DRAWINGS(S)

Next, there will be given a detailed description of the preferred embodiments of the present invention with respect to the accompanying drawings, in which:

FIG. 1c shows a schematic representation of the functionality of the inventive device for combining the intermediate results;

FIG. 1d shows a representation of the modular multiplication operation;

FIG. 1e shows a representation of the modular multiplication with addition;

FIG. 2c shows a schematic representation of the multiplication operation;

FIG. 2d shows a special representation of the inventive MultAdd operation;

FIG. 2e shows a special representation of the MultModAdd operation;

FIG. 2f shows a special representation of the modular multiplication operation;

FIG. 2g shows a schematic representation of the MultModDiv operation sequentially used in the present invention;

FIG. 3a shows a general representation of the inventive MultAdd operation;

FIG. 3b shows a base version of the reduction operation;

FIG. 3c shows a first preferred version of the reduction operation;

FIG. 3d shows a second preferred version of the reduction operation;

FIG. 3e shows a third preferred version of the reduction operation;

FIG. 3f shows a fourth preferred version of the reduction operation;

FIG. 4e shows a tabular comparison of various algorithms;

FIG. 6a shows a preferred implementation of the modular multiplication algorithm;

FIG. 6b shows a preferred register implementation of the algorithm of FIG. 6a;

FIG. 7a shows a preferred implementation of the MMA operation;

FIG. 7b shows an alternative implementation of the MMA operation;

FIG. 8b shows a preferred register implementation of the MMA operation of FIG. 8a;

FIG. 8e shows a calculating example for the present invention illustrating the register loading of the short auxiliary and result registers for each intermediate step;

FIG. 9a shows a preferred implementation of the TC operation (TC=treat carry);

FIG. 9b shows a preferred implementation of the TB operation (TB=treat borrow);

FIG. 9c shows a preferred implementation of the reduction operation;

FIG. 9d shows a preferred implementation on the register level of the reduction operation of FIG. 9c;

FIG. 11b shows a register implementation of the MMD operation of FIG. 11a;

FIG. 12 shows a register implementation of the calculation (estimation) of $\epsilon$ and/or e;

FIG. 13a shows an implementation of a transform rule for the modulus;

FIG. 13b shows an implementation of the DIV operation; and

FIG. 13c shows a schematic representation of a reduction algorithm for the final reduction.

DETAILED DESCRIPTION

Figure 1A:
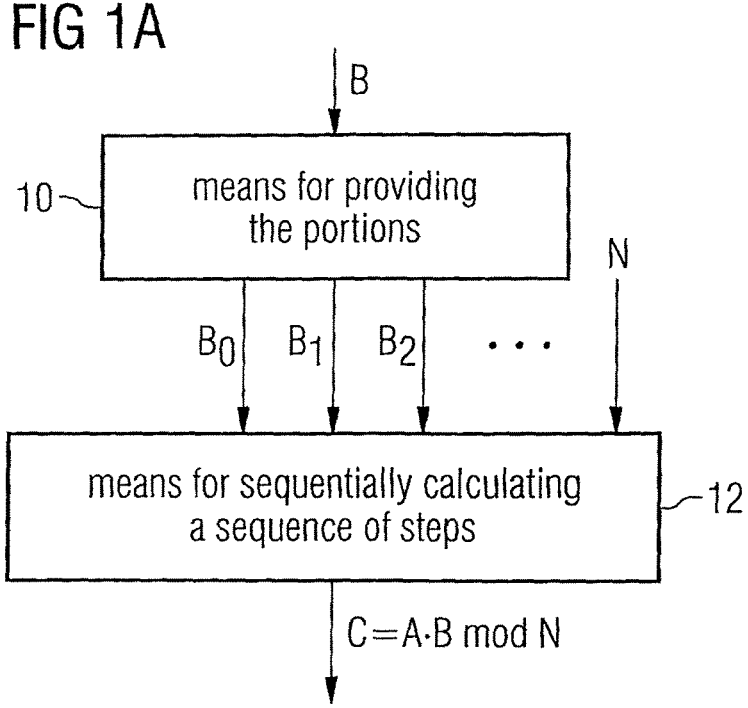
FIG. 1a shows a schematic representation of the device for calculating a result of a modular multiplication according to a preferred embodiment of the present invention.

Preferred embodiments of the present invention make use of the fact that at least the multiplicand is divided into at least three portions, wherein each portion comprises a number of digits less than half the number of digits, wherein the at least three portions of the multiplicand include all digits of the multiplicand. Furthermore, means for sequentially calculating is provided to sequentially calculate an intermediate result for each portion of the multiplicand, and to then obtain a result of the modular multiplication using these intermediate results.

By splitting the multiplicand into at least three portions, a dividable calculating unit may preferably be used, in which the multiplicand and preferably also the multiplier and the modulus is divided into three or more parts, so that each third of the number may be accommodated in one half of the co-processor. Thus, the calculating unit itself may also be utilized in full length, and no hardware resources are wasted.

In preferred embodiments, a division of all registers of the calculating unit is done, namely into registers of the same length, and furthermore all operands, i.e. both the multiplier and the multiplicand and the modulus, are divided into three or more parts as well, so that in the end, for the calculation of the (long) modular multiplication, only logic and arithmetic operations are required that are done with numbers whose length, i.e. whose number of digits, is maximally equal to the number of digits of one portion of the numbers. Preferably, in order to obtain optimum utilization of a calculating unit, the portion into which a number is divided, i.e. the number of bit slices of the calculating unit that has to perform these operations with a smaller number of digits, is selected such that they correspond to one half of the dividable calculating unit.

According to the invention, a calculating method using the MultModDiv operation is used, in which there are preferably never used more than ten short registers of the calculating unit, wherein two short registers of the calculating unit in short mode correspond to one register of the calculating unit in long mode.

In particular, in order to calculate the modular multiplication, the whole task is divided into three multiplication modulus addition operations to be performed sequentially in the present invention, wherein another portion of the multiplicand B is used for each one of these individual operations. Each such multiplication modulus addition operation is, in turn, divided into a multiplication addition operation and a subsequent reduction operation, wherein, in the multiplication addition operation, there is always used the currently considered portion of the multiplicand B, and in individual iteration steps, corresponding portions of the intermediate result C obtained from the previous step and the multiplier A are used.

According to the invention, this multiplication addition operation is now divided into several MultModDiv operations, i.e. into modular multiplications, which respectively provide the integer quotient, i.e. the DIV result, and the remainder, i.e. the MOD result. Both the DIV result and the MOD result are short numbers that may be stored in short registers. The short registers in which results of the MMD operation are stored are also referred to as auxiliary registers, because they are written to several times in the process of the iterative processing of the multiplication addition operation. In other words, the results of an MMD operation are only required for the subsequent updating operation, in which a piece of the result number, namely a portion of the result number fitting into a short register, is successively calculated. Specifically, during updating, the result of the previous MMD operation is updated using an addition of portions of the third operand C, i.e. the intermediate result of a previous step.

According to the invention, each updating step provides two entries into a result register, wherein the more significant entry into the result register already represents a final result that is not changed anymore, while the less significant entry of the two obtained results will still be changed by a result of an updating step depending on the current number situation.

The present invention thus only needs a calculating unit for a multiplication addition operation that has a word width equal to the length of only one portion and not the whole length of an operand, i.e. which has a short word width. In other words, such a calculating unit only requires internal registers of short length and not of long length. In addition, only in a preferred embodiment of the present invention only two auxiliary registers and—for a division into three portions—four short result registers are required. The multiplication addition operation may thus be calculated with only six short registers. In this case, the calculating unit is a bit slice stack, wherein each bit slice has a full adder function, i.e. receives a carry from a lower bit slice and passes a carry on to a higher bit slice, wherein "higher" and "lower" refers to the significance of the processed binary digits. If there is only a calculating unit with six internal registers, the calculating unit must be able to receive the additional operands from an external memory, i.e. the portions of the intermediate result from a previous iteration step and the required portions of the multiplier A and, if necessary, the current portion of the multiplicand B.

In the preferred embodiment of the present invention, a number of 10 or 12 short registers is sufficient for calculating the multiplication addition operation, which may be obtained by halving five or six long registers, wherein there is further available a working memory, which is typically called "XDATA", in which further portions are stored. This working memory, however, only has to be accessed with respect to a single portion of a single operand in each cycle, so that an operation may be efficient and with a small number of working memory accesses, but with maximum utilization of the internal registers. It is to be noted that the inventive concept of calculating the result of a multiplication addition operation may be used not only as part of a modular multiplication, but in all cases where, using a processor allowing only short word lengths due to its construction, a multiplication addition operation is to be calculated that includes long operands, i.e. operands having a word length that may not be processed by the calculating unit in one go.

FIG. 1a shows a schematic representation of an inventive device for calculating a result of a modular multiplication with a multiplier A, a multiplicand B and a modulus N. Originally, the multiplier A, the multiplicand B and the modulus are each numbers extending from a least significant digit (the LSB in the binary case) to a most significant digit (the MSB in the binary case). The operands A, B, N have a length less than or equal to a certain number of bits, such as 1536 bits in the scenario in block 46 described in FIG. 4d.

Figure 1B:
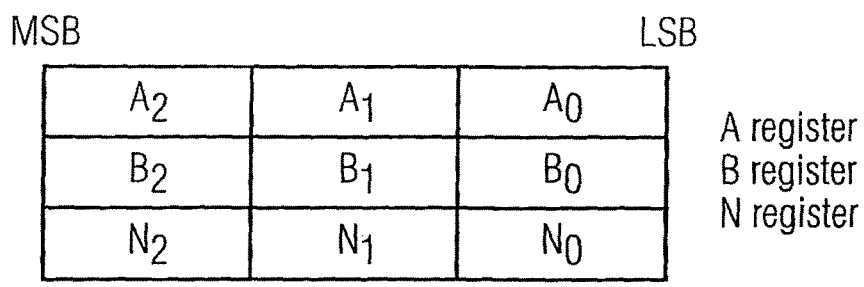
FIG. 1b shows a register representation of the operands A, B, N of FIG. 1a and the division of the operands into portions.

Each portion of the multiplicand B provided by means 10 for providing the portions has a length of 512 bits in the embodiment shown in FIG. 1b, i.e. a length equal to a third of the original length of the multiplicand B. Thus, all portions are equal in length. The number B may then be written as illustrated in FIG. 1b. The number Z represents the "register shift number" or the corresponding multiplier to be multiplied to the second and/or, in squared form, to the third portion to recombine the number B from the portions $B_0$, $B_1$, $B_2$. i directly means the number of digits and/or the number of bits that a portion has. It is to be noted that the embodiment shown in FIG. 1b is exemplary for a uniform division of a number into three portions. According to the invention, however, there may also be generated more than three portions and preferably an odd number of portions, and there may also be generated portions having unequal lengths, i.e. that, for example, the first portion is somewhat shorter than a third and the second portion is somewhat longer than a third, etc. However, with respect to an optimum adaptation of the division into portions by the means 10 of FIG. 1a to the calculating unit, portions of equal length are preferred.

The portions of a number may thus represent the number directly, so that the portions directly have the digits of the number and yield the number when they are cut out, so to speak, and put together. Alternatively, and sometimes even preferably, the number is calculated from the portions using the division number Z, so that the portions represent the number here as well, but the representation is not done via directly putting them together, but via a calculation with the division number Z, as indicted in FIG. 1b at "generally".

The means 10 for providing the multiplicand in at least two portions thus receives the number B on the input side and provides the three or more portions $B_0$, $B_1$, $B_2$ on the output side, wherein each portion has a number of digits less than half the number of digits, and wherein the means 10 for providing is further selected to perform the portion division so that the generated portions together include all digits of the multiplicand.

The means 10 provides the portions to means 12 for sequentially calculating a sequence of steps. In particular, the means 12 for sequentially calculating a sequence of steps is designed to calculate a first intermediate result for the use of a more significant portion of the multiplicand, as illustrated at 14 in FIG. 1h. This first intermediate result is then used to calculate a second intermediate result also using a less significant portion $B_1$. This second intermediate result is then used to calculate a third intermediate result using again a less significant portion $B_0$ of the multiplicand. The third intermediate result may already be the result of the modular multiplication, if only three portions have been used for the multiplicand. The third intermediate result may then be further processed according to the procedure shown in FIG. 1h, if further portion divisions have been performed, to then finally obtain the final result of the modular multiplication.

Although, in preferred embodiments, the means 10 for providing is designed to provide not only the multiplicand, but also the multiplier and the modulus into individual portions, the embodiment shown in FIG. 1a, in which only one operand of the multiplication is divided, already results in an advantage in that no long register is required for the multiplicand itself, but that a short register is sufficient there, because the whole multiplicand is never required due to the sequential calculating nature of means 12, but always only a portion of the multiplicand.

For calculating units in bit slice architecture, however, a division into portions of all operands and the modulus is preferred, as discussed below, to only have to use registers that have the same (short) length. In this context, there is also preferred a division of all parameters of the modular multiplication into portions of the same length, because the best calculating unit utilization is achieved when (short) registers of the same length are used.

According to the invention, it is preferred that a calculating unit is used for performing the modular multiplication that has at least one register having a length less than a length of the multiplicand, but larger than or equal to a portion of the multiplicand, wherein the means for calculating is designed to sequentially load a portion of the multiplicand into the register or read it from the register.

In a further preferred embodiment, a division of the numbers into exactly three portions is performed, and a calculating unit is used that is operated in a short mode, i.e. which is divided into two calculating unit halves in which the three portions of the respective numbers are processed.

Figures 2A, 2B:
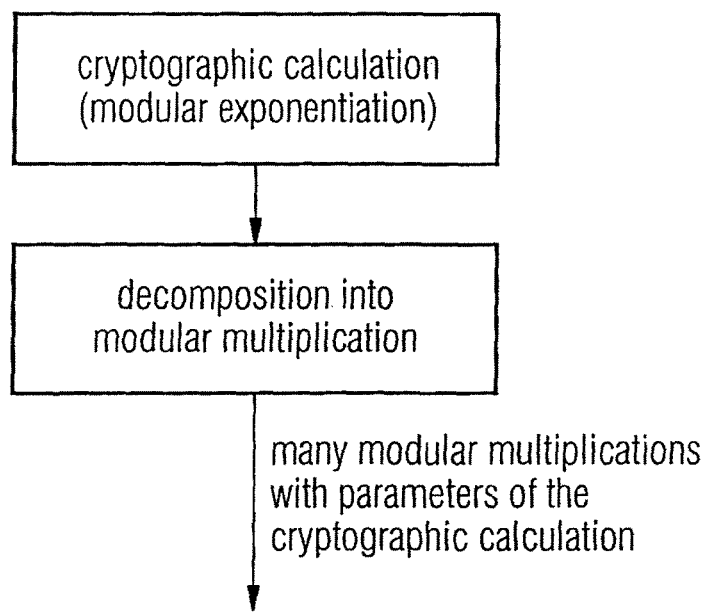
FIG. 2a shows a general representation of the field of application of the modular exponentiation.
FIG. 2b shows a schematic representation of the decomposition of a modular exponentiation into modular multiplications.

Subsequently, a preferred embodiment of the present invention is given in which a 2048 bit multiplication is implemented. First, however, an overview of certain used notations and operations is given. Essentially the following is about the calculation of the modular multiplication as illustrated in FIG. 2f.

N is defined to be the bit length of N, i.e., if n=#N. then $N \in [2^{n-1}, 2^n[$.

A mod N denotes the usual remainder of A modulo N, i.e. A mod $N \in [0, N[$.

A mod' N denotes the negative remainder of A modulo N, i.e. A mod'$N \in ]-N, 0]$, i.e. A mod' N=A mod N−N, if A mod N>0.

There will be used several notations for integers: Let $Z \geq 2$ be some integer, then there will be written for the integer $N \geq 0$ $$N = (N_2|N_1|N_0)_Z$$

wherein $$N_0 := N \bmod Z,$$

$$N_1 := (N \text{ div } Z) \bmod Z,$$

$$N_2 := N \text{ div } Z^2.$$

Although there may be used the notation $$N = N_2 \cdot Z^2 + N_1 \cdot Z + N_0$$
$$= (N_2, N_1, N_0)_z$$

this latter notation does not imply that $N_1$ and $N_0$ are reduced modulo Z, while the first notation $(N_2|N_1|N_0)_Z$ does imply this: In this notation $N_1$ and $N_0$ are in $[0, Z[$. However, $N_2$ may be larger than Z. this is in the case of $N \geq Z^3$. Equivalently, $N_2$ may be negative in the case of N<0.

Furthermore the generalizations $(N_{m-1}| \ldots |N_0)_Z$ as well as $(N_{m-1}, \ldots, N_0)_Z$ are analogously used in the obvious way.

Think of Z as a power of two, e.g. $Z=2^{1024}$. But it is not necessary that Z is a power of two, neither any non-trivial power of an integer!

The following basic algorithms are fundamental and always used. Their implementation will be discussed later. Let $K \in N$.

The usual multiplication: A·B

The modular multiplication of bit length K: A·B mod N

The MultModDiv operation (FIG. 2g) of bit length K:

$$(A \cdot B \text{ div } N, A \cdot B \text{ mod } N)$$

Furthermore there is needed the MultAdd algorithm (FIG. 2d):

$$A \cdot B + C \cdot 2^K$$

and the MultModAdd (FIG. 2e):

$$A \cdot B + C \cdot 2^K \text{ mod } N$$

There is often written:

$$M_K(A,B) = A \cdot B,$$

$$MM_K(A,B;N) = A \cdot B \text{ mod } N,$$

$$MMD_K(A,B;N) = (A \cdot B \text{ div } N, A \cdot B \text{ mod } N).$$

The performance and/or speed of these algorithms, which is not classified any further at this point, depends on their implementation. So in the following it will be denoted by $m_K$, $mm_K$, $mmd_K$, etc.

Note that the index is used in a very free manner, sometimes, if the exact K is not important, the index is left out, sometimes K is replaced by the actual number base $2^K$. Even other bases are used. More about this in the following sections.

Remark 1: Note the very important fact that for $(Q, R) := MMD_K(A, B; N)$ there is the identity $$A \cdot B = Q \cdot N + R.$$

This is a fundamental fact for many implementations, which are following.

In this section there are given some hints as to how the basic algorithms are implemented in the Crypto@1408—if they can be implemented in a direct way. Furthermore there are discussed some very basic and general methods to break down long integer arithmetic into smaller pieces.

Multiplication

On the Crypto@1408, multiplications of a length up to 1400 bits (including sign bits) are possible, i.e. $A \cdot B$ for $\#A + \#B \leq 1400$. The average performance on the Crypto@1408 for this operation is given by $$\frac{\#B + 1}{1.75} \text{ au.}$$

For more about this multiplication algorithm, see [5, 6, 8]. Usually, in order to break down a long multiplication into smaller pieces, the well-known high-school method is used: Set, for example, $Z := 2^k$ for some suitable k and write $A = (A_{m-1}, \ldots, A_0)_Z$ as well as $B = (B_{m-1}, \ldots, B_0)_Z$, then the method can be roughly described as it is shown in FIG. 2c.

The line in the loop will be read in the following way: The old value of the partial integer $(C_{i+j+1}, C_{i+j})_Z = C_{i+j+1} \cdot Z + C_{i+j}$ is added to the partial product $M_k(A_i, B_j)$ yielding the result X. Then set $C_{i+j+1} := X \text{ div } Z$ and $C_{i+j} := X \text{ mod } Z$. Of course, hidden in these instructions are treatments of carries, which will not be discussed any further here.

There are faster ways to implement a multiplication, e.g. with KARATSUBA-OFFMANN, cf. [9]. But, although these algorithms are very good in theoretical performance, they often have the disadvantage that they are not optimal for implementation, e.g. they need very much resources like memory.

Modular Multiplication

On the Crypto@1408, modular multiplications of a length up to 1400 bits are possible, i.e. $A \cdot B \text{ mod } N$ for $LR := \#N + 1 \leq 1400$. The realization is done via the so-called ZDN algorithm –[11]. The average performance on the Crypto@1408 for this operation is given by $$\frac{LR}{\alpha} \text{ au}$$

The factor $\alpha = \alpha_{LR}$ is a parameter which depends on the statistical properties of the ZDN algorithm. For $\alpha_{LR}$, values are usually between 2.5 and 2.7.

One way to implement the multiplication for longer bit lengths is to break it down into smaller pieces. Looking at the equation for m=3

$$A \cdot B \text{ mod } N = A(B_2 Z^2 + B_1 Z + B_0) \text{ mod } N$$

$$= (((A \cdot B_2 \text{ mod } N)Z + A \cdot B_1 \text{ mod } N)Z + A \cdot B_0) \text{ mod } N$$

it can be seen that a modular multiplication $$A \cdot B \text{ mod } N$$

can be realized as in FIG. 1d, wherein operation MMA is shown in FIG. 1e.

Of course, this is only one way to do this. Some derived versions of this are presented in this paper.

The MultModDiv Operation

Figures 10A, 10B:
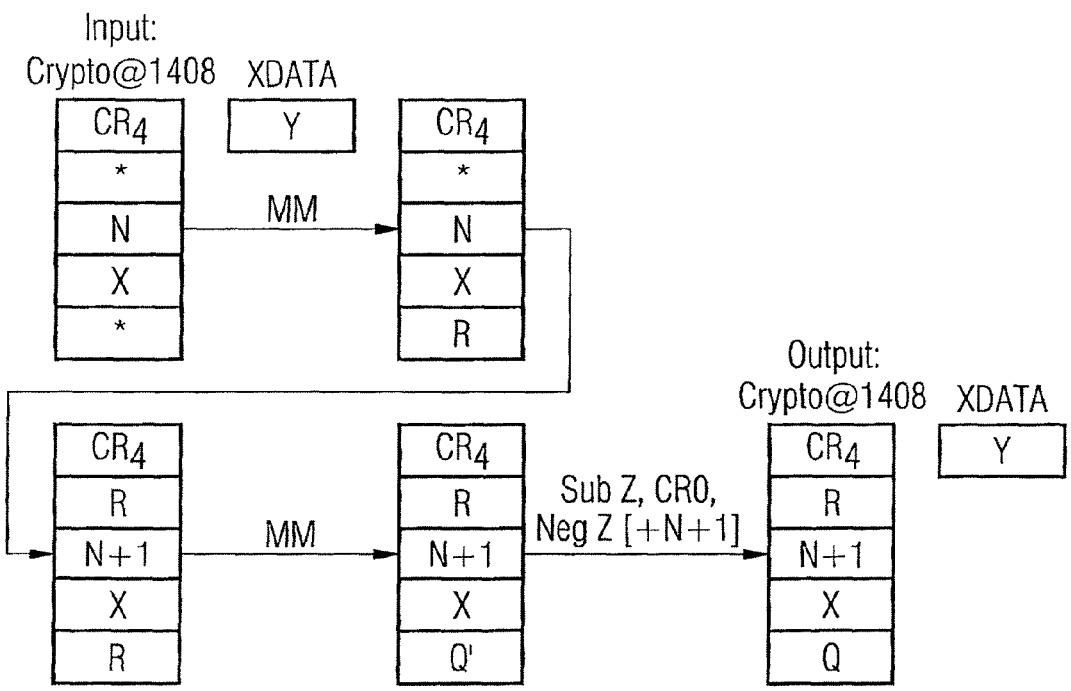
FIG. 10a shows a representation of the MMD operation.
FIG. 10b shows a preferred register implementation of the MMD operation.

The MultModDiv operation is a recently introduced operation, cf. [7], which does a little bit more than a modular multiplication: It not only computes the modular product $(A \cdot B \text{ mod } N)$, but also the quotient $(A \cdot B \text{ div } N)$. Implemented in HW, the additional implementation overhead is small, since this last integer is just a protocol of what the modular reduction was doing during the modular multiplication. In SW the overhead is significant, but surprisingly only 100%! The algorithm can be implemented as shown in FIG. 10a.

Note that this algorithm only works for positive and reduced A and B. It will be needed later on also for a (reduced) negative multiplicand, but in this case only the negative integer is inverted, the latter algorithm is applied and finally the output is inverted. Also, it is possible to run the two modular multiplications in parallel (mode) if the modulus is small enough. This means again a doubling of the performance. More about this with respect to FIGS. 11a and 11b. As one can see there, the performance for $MMD_k$ is given by:

$$mmd_k := \begin{cases} mm_k & \text{if } LR \leq 695 \\ 2 \cdot mm_k & \text{if } LR > 695 \end{cases}$$

In the algorithm representations, according to usual pseudo code notation, the term "input" stands for the algorithm input parameters. The term "output" stands for the algorithm output. The term "return" stands for jumping back and/or giving back the corresponding value to a hierarchically higher program that invoked the algorithm. The argument of "return" is thus the actual result of the algorithm that has been calculated. Furthermore, "for" stands for a repetition loop that is to execute something given by the term "do" starting from a start parameter "to" to an end parameter. "end" stands for the end of a loop. Furthermore, "if" stands for a conditional loop, wherein "when" indicates what to do if the condition of the if loop is fulfilled.

Correspondingly, "else if" indicates a further condition that has to be fulfilled instead of a first condition to perform a certain calculation introduced by "then". The term "treat carry" stands for treating a carry, wherein borrow stands for a negative carry, i.e. so to speak a "carry forward".

Figure 4A:
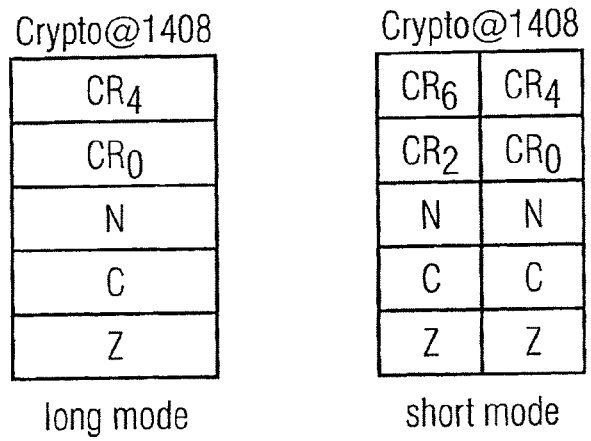
FIG. 4a shows a representation of the register situation of a calculating unit in long mode and in short mode.
Figure 4B:
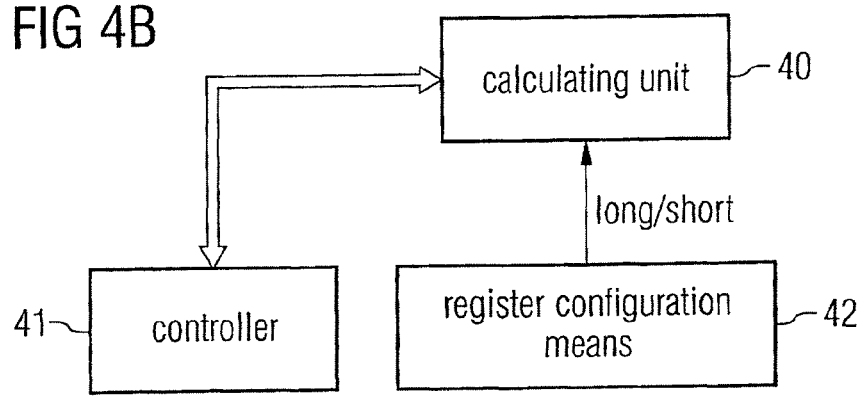
FIG. 4b shows a schematic representation of a configurable calculating unit.
Figure 4C:
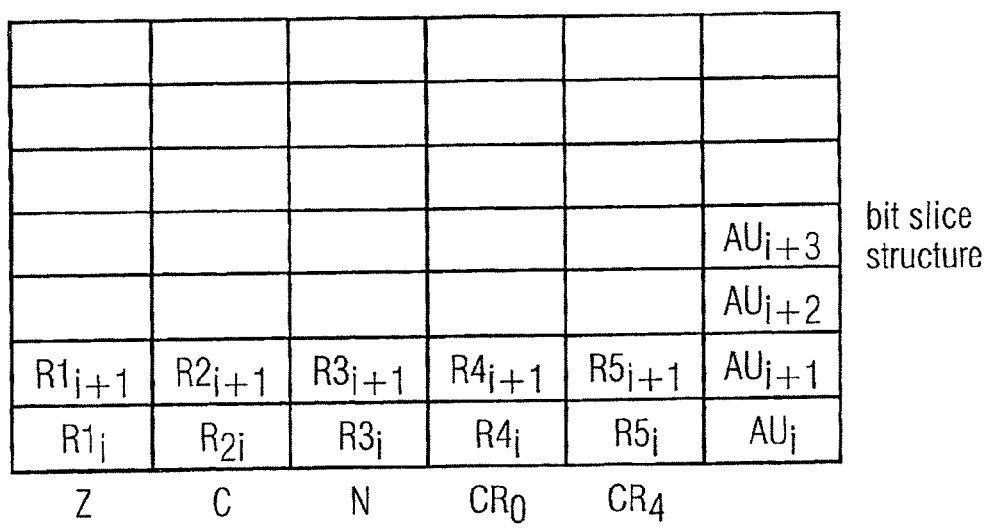
FIG. 4c shows a schematic representation of a bit slice structure of a calculating unit.
Figure 4D:
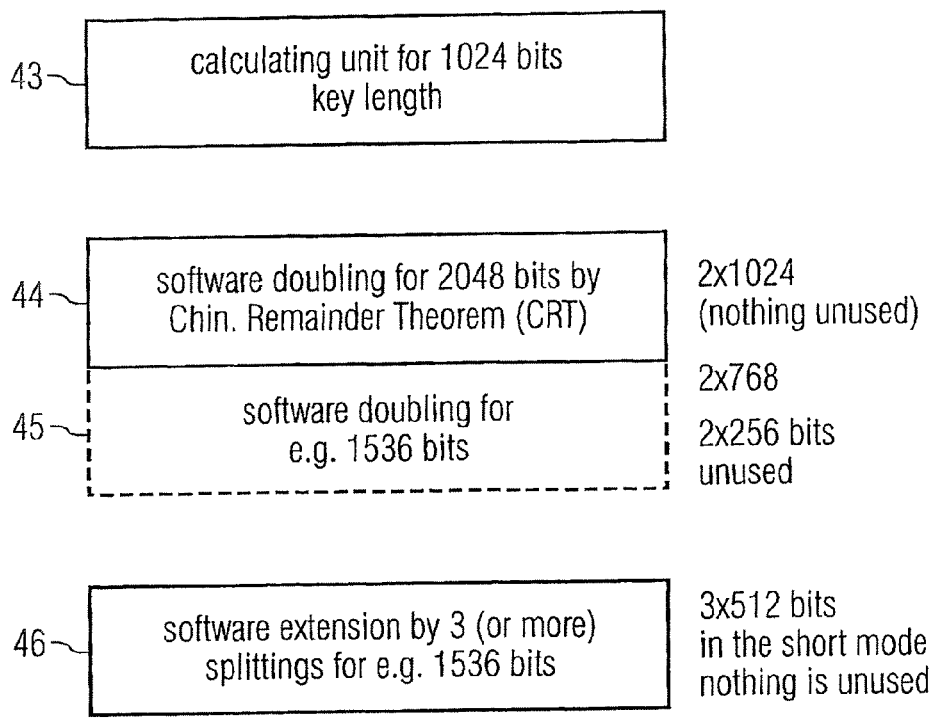
FIG. 4d shows a schematic representation of the various possibilities of software doubling as compared to the inventive software extension by three or more splittings.

In the following, there are further given some register implementations, such as they are to be seen, for example, in FIG. 6b. Under "Crypto@1408", the registers of the preferably used crypto co-processor with 1408 bit slices can be found, which are, however, operated in the short mode due to the division in the middle. The register notation in all register implementations is as illustrated in FIG. 4a in the right sub-image. For example, the second field in the right column stands for the register $CR_0$ of the processor. Furthermore, the numbers in the fields stand for the corresponding values stored into the corresponding register. If there are "asterisks" in a register, this means that the register is unused, i.e. the register may be occupied with undetermined numbers, which, however, do not play any further role. Furthermore, the vertical column of fields described with "XDATA" stands for an external memory, i.e. refers to a RAM working memory of the processor, while the twelve registers are the internal registers of the memory. Thus, if data are to be loaded from the external RAM memory into the registers of the co-processor, data movement commands (move commands) are necessary.

Register Architecture of Crypto@1408

The following will illustrate the implementations of the algorithms with the assignments of the Crypto registers with the intermediate results. There is shown the Crypto@1408 in the two modes, namely the long mode and the parallel mode (FIG. 4a).

In long mode, there are 5 registers of a length of 1.408 bits: Z, C, N, $CR_0$ and $CR_4$.

In parallel mode, there are 10 registers of a length of 704 bits: $CR_0$, $CR_2$, $CR_4$ and $CR_6$, as well as three registers Z, C, N for each side.

The basic configurations are illustrated as shown in FIG. 4a:

Moving Data

Depending on the fact that the data may lie in the cache or in the XRAM (external memory), it can take more or less time to move an integer into or out of the Crypto@xxxx. The following assumes an average value for the performance $mov_k$ to move a k-bit integer into or out of the Crypto. Some examples show that the moves take a significant time comparable to multiplications.

The Modular Multiplication Algorithms

There are several algorithms for implementing a modular multiplication on the basis of simpler elements like (small) multiplications or a smaller modular multiplication. By virtue of these algorithms, it is possible to implement a modular exponentiation by "square and multiply" or Lucas-chain methods (Montgomery ladder). We are not going the way of finding optimal performance algorithms for square and multiply respectively, since this eliminates the possibility of a secure implementation of RSA if needed.

Although what is of interest is actually the algorithm $MM_{2048}$, it can be seen that $A \cdot B \bmod N = A(B_2 Z^2 + B_1 Z + B_0) \bmod N$, or equivalently this expression can be written as $((A \cdot B_2 \bmod N)Z + A \cdot B_1 \bmod N)Z + A \cdot B_0 \bmod N$. Therefore, the implementation of $MM_K$ may sometimes be broken down to some "smaller" algorithms like $MMA_k$, for some k<K.

Although sometimes these algorithms need additional data (hence some precomputations may be necessary), this is not taken into account and they are not counted. Usually, they have no impact on the performance of the full RSA computation. They may, however, have an impact on the performance of a "short" RSA, like a verification with a small exponent $F_4 = 2^{16} + 1$.

Montgomery Multiplication

Without doubt, the most famous algorithm for implementing a modular multiplication is the Montgomery Multiplication [10]. This multiplications algorithm actually does not implement the algorithm $MM_K(A, B; N) = AB \bmod N$, but rather $$A \cdot B \cdot 2^{-K} \bmod N$$

Without going into detail, with this strange kind of modified multiplication, it is possible to implement a K-bit-RSA calculation with the same number of multiplications as in the usual implementations which use $MM_K$.

Multiplication with Barrett Reduction

At the moment, a discussion about this method is left out, since usually Barrett reduction has the same performance as the last method. It is not expected that in this context there will be a much better implementation than the one in the last section.

Fischer-Sedlak-Seifert's Algorithm with MMD

This algorithm was designed in order to make a 1 k-bit RSA co-processor fit for 2 k-bit operations needing only a minor hardware add-on. The algorithm, described in [7, 2], is specifically used for doubling the bit length. It uses the MultModDiv algorithm, which has to be built into the hardware, cf. [4], or may be emulated in software, cf. [3], with two modular multiplications.

Preferred Inventive Algorithm with MMD

This algorithm implements the modular multiplication in the classical way, by computing $$A \cdot B \bmod N \text{ via } A \cdot B - \left\lfloor \frac{A \cdot B}{N} \right\rfloor \cdot N$$

However, because of practical reasons and architectural restrictions, this will be done in three steps—as described above—by implementing for K=m·k with m=3 and k=⌈K/33⌉. Thus, $MM_K$ will be implemented as in FIG. 1d.

Now, $MMA_Z$ is the algorithm given (FIG. 1e).

$N_2$ will be very close to Z. However, at the moment, there are no restrictions with respect to the integer Z, except that Z has to have about the correct size of k bits. But more about that later.

Figures 1F, 1G, 1H:
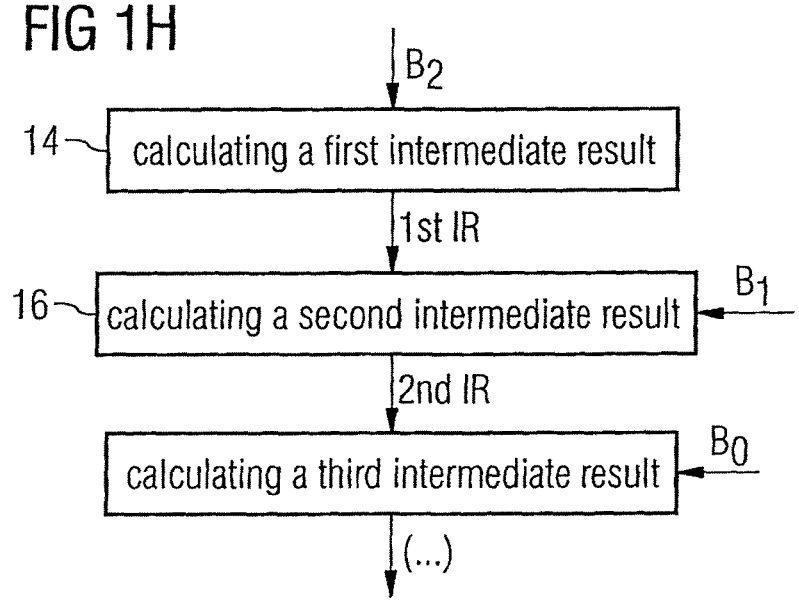
FIG. 1f shows a schematic representation of the multiplication with addition.
FIG. 1g shows a schematic representation of the reduction operation.
FIG. 1h shows a schematic representation of the sequential calculation of the intermediate results.

Again, this last algorithm will be implemented in two steps, namely: First the multiplication shown in FIG. 1f is performed.

Note the following estimation.

Remark 5: For the output of $MA_Z$ $$D = AB_i + CZ \in [0, N-1] \cdot [0, Z-1] + [-N, 0] \cdot$$

$$Z \in [0, NZ - N - Z + 1] + [-NZ, 0]$$

$$= [-NZ, NZ - N - Z + 1]$$

$$\subseteq [-nZ, NZ[$$

and in particular for $D = (D_3 | \ldots | D_0)_Z$ $$D_3 = D \text{ div } Z^3$$

$$\in [-N_2 - 1, N_2].$$

$$\subseteq [-Z, Z[$$

After the multiplication step, there is the reduction of FIG. 1g.

In the following, there is first of all presented the mathematical description of $MA_Z$ and $Red_z$ with a little theory, which will be important for the implementation.

Description of the Algorithm

From now on, any algorithms will be given for the case of m=3. Because this is the case needed. However, k will not be fixed yet.

The multiplication operation $MA_Z$ (FIG. 3a), i.e., $$(A_2|A_1|A_0)_Z \cdot B_i + (C_2|C_1|C_0)_Z \cdot Z$$

or equivalently $$(A_2|A_1|A_0)_Z \cdot B_i + (C_2|C_1|C_0|0)_Z$$

will be implemented in the straightforward way:

$$AB_i + CZ = A_0 B_i + (A_1 B_i + C_0)Z + (A_2 B_i + C_1)Z^2 + (A_2 B_i + C_2)Z^3 + C_3 Z^3$$

Since $A_j \cdot B_i$ is a 2 k integer, this product is written as $$A_j \cdot B_i = (BA_{ij})_1 \cdot Z + (BA_{ij})_0$$

and therefore the result is $$(BA_{i0})_0 + ((BA_{i0})_1 + (BA_{i1})_0 + C_0)Z + ((BA_{i1})_1 + (BA_{i2})_0 + C_1)Z^2 + ((BA_{i2})_1 + C_2)Z^3$$

Note that the large brackets still may be $\geq Z$!

The reduction operation $Red_Z$ (FIG. 3b), i.e. E:=D mod N will be implemented as $$E := D - [D \text{ div } N] \cdot N.$$

Here, $$[D \text{ div } N] := \left\lfloor \frac{D}{N} \right\rfloor.$$

However, since $Q_0 := D$ div $N$ cannot be computed directly, the strategy is to first approximate $Q_0$ by $\tilde{Q}_0$, wherein $$\tilde{Q}_0 := D_3 \cdot Z \text{ div } N_2.$$

Hence, $Q_0 = \tilde{Q}_0 + \epsilon$ can be written. A computation shows that $\epsilon \in \{-2, -1, \ldots, 4\}$, and in this context it will even be $$\epsilon \in \{-2, -1, 0, 1, 2, 3\}.$$

Remark 6: In fact, $\epsilon = -2, 3$ will almost never happen and $\epsilon = 2$ only very seldom.

Thus, the first version of the plain (base) algorithm of FIG. 3b will be as in FIG. 3c.

Remark 7: The range of $Q_0$ is given by:

$$Q_0 = \left\lfloor \frac{D}{N} \right\rfloor$$

$$\in \left[ \left\lfloor \frac{-NZ}{N} \right\rfloor, \left\lfloor \frac{NZ-1}{N} \right\rfloor \right]$$

$$= [-Z, Z[$$

Unfortunately, the problem of the exact computation of the division $$\frac{D}{N}$$

was only postponed. But since this worked very well, it will be done a second time: $\epsilon$ is approximated by $\tilde{\epsilon}$ such that $$\delta := \epsilon - \tilde{\epsilon} \in \{-1, 0, 1\}. \qquad (2)$$

Then the reduction looks like in FIG. 3d.

Now, how is $\epsilon$ approximated? Look at the following equation:

$$(D - \tilde{Q}_0 N) \bmod N = D \bmod N$$
$$= (D - \tilde{Q}_0 N) - \epsilon N$$

This yields $$\epsilon = (D - \tilde{Q}_0 N) \text{ div } N,$$

and therefore $D - \tilde{Q}_0 N$ is computed: Set $$\tilde{Q}_0 := D_3 Z \text{ div } N_2 \text{ and } \tilde{R}_0 := D_3 Z \bmod N_2,$$

so that $D_3 Z = \tilde{Q}_0 N_2 + \tilde{R}_0$. Now $$D - \tilde{Q}_0 N =$$
$$(D_2 + \tilde{R}_0 - (\tilde{Q}_0 N_1)_1)Z^2 + (D_1 - (\tilde{Q}_0 N_1)_0 - (\tilde{Q}_0 N_0)_1)Z + (D_0 - (\tilde{Q}_0 N_0)_0)$$

Here, the notation $(\tilde{Q}_0 N_i)_1 := \tilde{Q}_0 N_i$ div Z and $(\tilde{Q}_0 N_i)_0 := \tilde{Q}_0 N_i$ mod Z was used, so that $\tilde{Q}_0 N_i = (\tilde{Q}_0 N_i)_1 Z + (\tilde{Q}_0 N_i)_0$.

From all this, there may now be given an approximation for $\epsilon$ by computing $$\tilde{\epsilon} := (D_2 + \tilde{R}_0 - (\tilde{Q}_0 N_1)_1) \text{ div } N_2.$$

In fact, the operands are approximated by their uppermost (say, for example) 16 bits. There still remains the work of proving that $$\delta := \epsilon - \tilde{\epsilon} \in \{-1, 0, 1\}.$$

This will be done later. Now, it is possible to give the following version of $Red_Z$ shown in FIG. 3e.

Observe the following computation:

$$D - \tilde{Q}_0 N - \tilde{\epsilon} N = (D_2 + \tilde{R}_0 - (\tilde{Q}_0 N_1)_1 - \tilde{\epsilon} N_2)Z^2 +$$
$$(D_1 - (\tilde{Q}_0 N_1)_0 - (\tilde{Q}_0 N_0)_1 - \tilde{\epsilon} N_1)Z + (D_0 - (\tilde{Q}_0 N_0)_0 - \tilde{\epsilon} N_0)$$
$$= (D_2 + \tilde{R}_0 - (Q'_0 N_1)_1 - \tilde{\epsilon} N_2)Z^2 +$$
$$(D_1 - (Q'_0 N_1)_0 - (Q'_0 N_0)_1)Z + (D_0 - (Q'_0 N_0)_0)$$

By virtue of this computation, the final version of the algorithm may be given, as shown in FIG. 3f.

Remark 8: Note the slight difference in the first lines: $(\tilde{Q}_0, \tilde{R}_0) := MMD(D_3, Z; N_2)$ was replaced by $$(\tilde{Q}_0, \tilde{R}_0) := MMD(D_3, Z - N_2; N_2)$$

$$\tilde{Q}_0 := \tilde{Q}_0 + D_3$$

First of all, it is easy to check that this new equation still holds! This change was done because it is not desired that operands are larger than the modulus, and in this case Z>N. However, since $$N \in \left[ \frac{2}{3} Z^3, Z^3 \right[$$

or more precisely $$N_2 \in \left[\frac{2}{3}Z, Z\right[,$$

it is certain that $$Z - N_2 \in \left[0, \frac{1}{3}N_2\right[.$$

However, because of equation 1, the first operand is within $[-Z, Z[$, but it will be seen that this is no problem, since $$D_3 \cdot (Z - N_2) \in \left[-Z, Z\right[ \cdot \left[0, \frac{1}{3}N_2[ = ] - \frac{1}{3}ZN_2, \frac{1}{3}ZN_2\right[ \subseteq ] - N_2^2, N_2^2[$$

Furthermore, note the following:
Remark 9: Because of remark 7 and equation (2), $$Q'_0 \in [-Z-1, Z]. \quad (3)$$

Mathematical Performance

For the first part $MA_k$, there are needed 3 $mmd_k$, for the second part $Red_k$, there are also needed 3 $mmd_k$. Since this computation has to be done 3 times, the result is $$mm_K = 18 \cdot mmd_k.$$

Implementation for $(m, k) = (3, k)$

Figure 5:
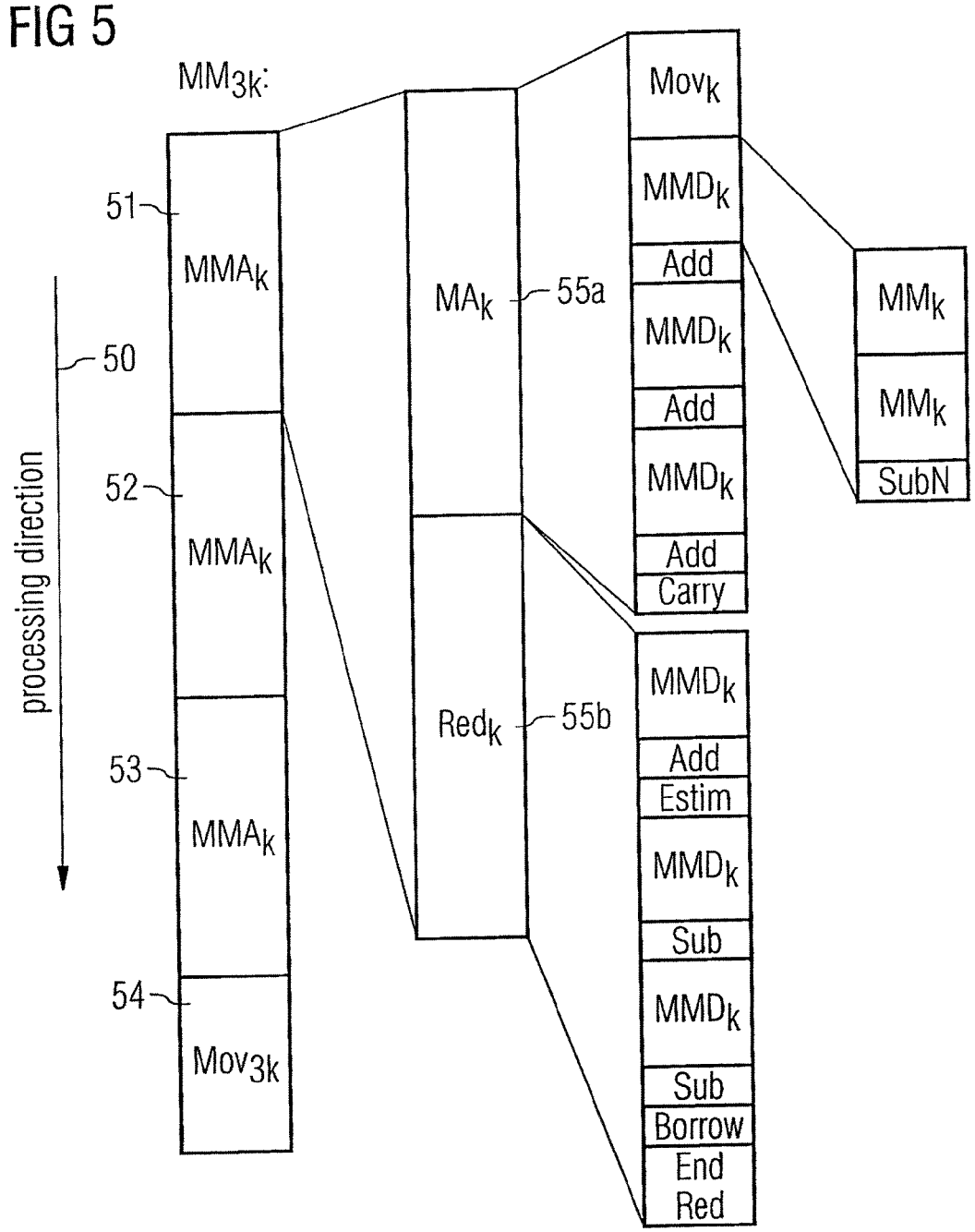
FIG. 5 shows a flow diagram of the inventive calculation.

The implementation of the algorithm is shown starting from FIG. 5.

System performance for $(m, k) = (3, k)$

It can be seen that the implementation of algorithm $MA_k$ needs 3 $mmd_k + mov_k$ and the implementation of $Red_k$ needs 3 $mmd_k$. This will be used three times and thereafter the result has to be moved outside of the Crypto, so that the performance will be:

$$3(6mmd_k + mov_k) + mov_K, \text{ i.e.}$$

$$\boxed{mm_k = 18 \cdot mmd_k + 6 \cdot mov_k}$$

The Range of $\epsilon$

The parameter $\epsilon$ was defined to be $$\varepsilon = Q_0 - \tilde{Q}_0 = \left\lfloor \frac{D}{N} \right\rfloor - \left\lfloor \frac{D_3 Z}{N_2} \right\rfloor,$$

wherein $D \in [-NZ, NZ[$, in particular $D_3 \in [-Z, Z[$. In order to give an estimation of $\epsilon$, first the real number $$\varepsilon := \frac{D}{N} - \frac{D_3 Z}{N_2}$$

is computed and then the following lemma is used.
Lemma 1 For $r, s \in R$. there is always $$\varepsilon := \frac{D}{N} - \frac{D_3 Z}{N_2}$$

Now set $$\lfloor r \rfloor - \lfloor s \rfloor = \begin{cases} \lfloor r - s \rfloor \\ \lfloor r - s \rfloor + 1 \end{cases}$$

and get $$\varepsilon = \frac{D}{N} - \frac{D_3 Z}{N_2}$$

$$= \frac{1}{NN_2}[DN_2 - D_3 ZN]$$

$$= \frac{1}{NN_2}[(D_3 | D_2 | D_1 | D_0)_Z N_2 - D_3 Z(N_2 | N_1 | N_0)_Z]$$

$$= \frac{1}{NN_2}[(D_2 | D_1 | D_0)_Z N_2 - D_3 Z(N_1 | N_0)_Z]$$

hence $$\varepsilon \in \frac{1}{NN_2}([0, Z^3[ \cdot N_2 - [-(N_2+1), N_2]Z[0, Z^2[)$$

$$= \frac{1}{NN_2}\left] - Z^3 N_2, 2 \cdot Z^3 N_2 + Z^2 \right[$$

$$= \left] \frac{-Z^3}{N}, \frac{2 \cdot Z^3}{N} + \frac{Z^2}{NN_2} \right[$$

$$\subseteq \left] \frac{-3}{2}, \frac{6}{2} + 2^{-2k} \right[ = \left] \frac{-3}{2}, 3 + 2^{-2k} \right[$$

Therefore, there is obtained $\lfloor \epsilon \rfloor \in \{-2, \ldots, 3\}$ and by virtue of the lemma $\ominus \in \{-2, \ldots, 4\}$. Nevertheless, assuming $$N \in \left[\frac{3}{4}Z^3, Z^3\right[,$$

then $$\varepsilon \in \left] \frac{-4}{3}, \frac{8}{3} + 2^{-2k} \right[ = \left] \frac{-4}{3}, 3 \right[$$

So it can be seen that in this case $\lfloor \epsilon \rfloor \in \{-2, -1, 0, 1, 2\}$ and $\epsilon \in \{-2, -1, 0, 1, 2, 3\}$.

How to estimate $\epsilon$

It could be seen that $\epsilon = aZ^2 + bZ + c$, wherein $a = (D_2 + \tilde{R}_0 - (\tilde{Q}_0 N_1)_1)$, $b = (D_1 - (\tilde{Q}_0 N_1)_0 - (\tilde{Q}_0 N_0)_1)$, $c = (D_0 - (\tilde{Q}_0 N_0)_0)$, and $\epsilon := a$ div $N_2$ was defined. Now set:

$$r = \frac{aZ^2 + bZ + c}{N}$$

$$s = \frac{a}{N_2}.$$

Then $$x := r - s = \frac{1}{NN_2}(N_2(bZ + c) - (N_1 | N_0)a)$$

Obviously $-4Z < a < 3Z$ $-5Z < b < Z$ $-Z < c < Z$

Then $$x < \frac{(N_2(Z^2 + Z) + 4Z^3)}{NN_2} < \frac{6Z^3}{\frac{Z^3}{2}\frac{Z}{2}} = \frac{24}{Z}$$

as well as $$x > \frac{-(N_2(5Z^2 + Z) + Z^2 3Z)}{NN_2} > \frac{9Z^3}{\frac{Z^3}{2}\frac{Z}{2}} = \frac{-36}{Z}$$

It can be seen that x=r−s is indeed very small, since Z will be in the range of $2^{700}$! So, practically, there will never be the case that $\epsilon \neq \epsilon$ (for general integers)

The actual approximation will be done by computing s using only the uppermost (e.g.) 16 bits of the involved integers, therefore there will be made an error of about the size $2^{-16}$. This is still very small, and only in a few cases the estimation of $\epsilon$ will be incorrect by 1. And this is the reason why a final reduction step is needed at the end of Red.

Analysis of the Algorithm

In this section, the three algorithms described in the previous sections are compared. These multiplication methods are denoted as Algorithm I, Algorithm II and Algorithm III, respectively.

Comparison of the Algorithms

Performance values—only for the time-consuming parts of the algorithms—are given in FIG. 4e. Of course, a real implementation will need about 10%-20% longer for all the software overhead, which is not described here.

Advantages/Disadvantages

Below 2.064 bits, the fastest multiplication is Algorithm III. Above 2.065 bits, the only working algorithm is Algorithm II. Algorithm III needs the fewest external memory.

Implementation Aspects

In this section, the 2.048-bit RSA implementation on the Crypto@1408 will be described in detail. Of course, the main focus is on the implementation of the modular multiplication. It is clear how to set the multiplication in the framework of an exponentiation. So this will be described only very briefly. The modular multiplication A·B mod N presented here has a certain restriction: The integers A, B and N have to be transformed into a special form, namely it has brought from the binary form into the Z-ary form, e.g. $(A_2, A_1, A_0)_Z$ with three "digits". A and B, of course, have to be reduced. The precomputation will first decide the length k of the base parameter Z, transform the input values A, B and N into the right form, such that it is usable for the modular multiplication algorithm. Here, A and B will be just brought from the binary form into the Z-ary. The modulus N will be—as it is known for the usual implementation of RSA on the Crypto@xxxx—multiplied by a certain integer, and the exponentiation will be performed with this multiple of N. After the exponentiation, it is necessary to make the final reduction modulo the original N. And the result in Z-ary form is computed back into the old binary form.

It is superfluous to say that, with the pre- and post-computation, this algorithm is not well-suited for a single modular multiplication, although it is possible to do it. On the other hand, all other multiplication algorithms, e.g. the ones presented here, usually need some kind of pre- and post-computation, and in fact there is no really better way to do a simple modular multiplication.

Structure of the RSA Implementation

The framework of the RAS implementation is equal to any other implementation. First, there is the pre-computation, transforming the input parameters baseB* and modulus N* into the right form B and N. Then, the actual RSA implementation starts: It will be decided whether a squaring or the multiplication with the base will be done. Due to this decision, either the operation A←MM(A, A, N) or A←MM(A, B, N) will be carried out. There will be no description how to make this decision—this is standard for an RSA implementation. At the end, in post-computation, the result A will be reduced modulo the input modulus N* and transformed back into the binary form necessary for the output.

The following will describe the implementation of A←MM(A, B, N). For the squaring, i.e. A←MM(A, A, N), one can use A for the parameter B. It can even have the same allocated memory, since the result will be copied into the container of A at the very end.

Note that the exponentiation/modular multiplication only needs external memory for $A_2, A_1, A_0, B_2, B_1, B_0, N_1$ and $N_0$, i.e. maximally $$8 \cdot \frac{704}{8} = 704 \text{ bytes.}$$

An overview of the algorithm is given in FIG. 5.

FIG. 5 thus shows, so to speak, a flow diagram of the inventive modular multiplication algorithm for three portions. The processing direction and/or time direction is illustrated by an arrow 50 in FIG. 5. In order to perform modular multiplication, there are thus shown, as illustrated for example with respect to FIG. 1d, three MMA operations to be performed consecutively, which are designated 51, 52 and 53 in FIG. 5. The most significant portion $B_2$ of the multiplicand is used for the MMA operation 51. For the second MMA operation 52, the result of the first MMA operation and the next less significant portion $B_1$ of the multiplicand are used. The result of the second MMA operation is finally used together with the least significant portion $B_0$ of the multiplicand to obtain the final result of the modular multiplication. Next, the result is read out from the internal registers, i.e. $E_2$, $E_1$ and $E_0$, by means of a move command 54, to free the internal registers for a new modular multiplication.

Each MMA operation, for example the MMA operation 51, is divided into an MA operation 55a and a reduction operation 55b, wherein the MA operation, in turn, is again divided into various operations illustrated in FIG. 5, while the reduction operation is also divided correspondingly.

The Modular Multiplication Algorithm

The input for this modular multiplication is the modulus N, the multiplicand A∈[0, N[ and the multiplier B∈[0, N[.

Formally, there is an input parameter k defining the length of the computation. The output will be A·B mod N stored in the place of A residing in the external memory.

The entry conditions for this algorithm already discussed above are

N is encoded in three integers $N_2$, $N_1$ and $N_0$, such that $N_i \in [0, Z[$ and $N=N_2 \cdot Z^2 + N_1 \cdot Z + N_0$, shortly written as $N=(N_2, N_1, N_0)_Z$.

Furthermore, $N_2 \in [0, Z[$, such that $N_2$ is transformed according to the Crypto@xxxx architecture.

A is encoded as three integers $A_2$, $A_1$ and $A_0$, such that $A_i \in [0, Z[$ and $A=A_2 \cdot Z^2 + A_1 \cdot Z + A_0$, shortly written as $A=(A_2, A_1, A_0)_Z$.

B is encoded in three integers $B_2$, $B_1$ and $B_0$, such that $B_i \in [0, Z[$ and $B=B_2 \cdot Z^2 + B_1 \cdot Z + B_0$, shortly written as $B=(B_2, B_1, B_0)_Z$.

The modular multiplication algorithm is shown in FIG. 6a.

Figure 6B:
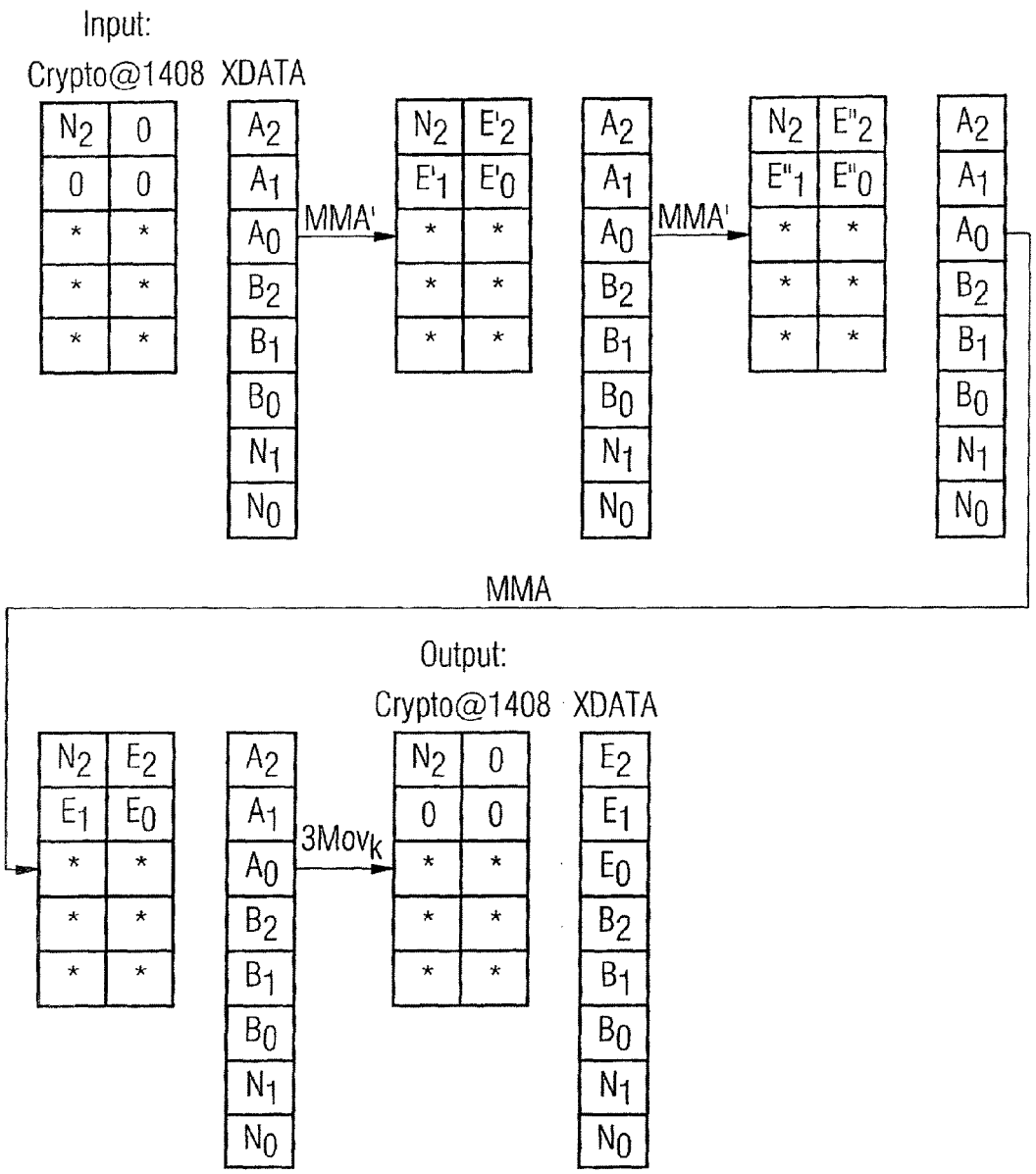

It is illustrated in FIG. 6b.

In the external memory XDATA, there are respectively the portions of the multiplier A and the multiplicand B and the least significant and the next more significant portion $N_1$ and $N_0$, while the most significant portion $N_2$ of the modulus is already in the $CR_6$ register of the crypto co-processor operated in the short mode. The other three registers $CR_4$, $CR_2$ and $CR_0$ are set to zero. The intermediate result of the first MMA' operation, i.e. $E_1'$, $E_2'$, $E_0'$, then replaces the zeros in the corresponding registers prior to the first MMA' step. The second MMA' step results in replacing the values $E_0'$, $E_1'$ and $E_2'$ by $E_0''$, $E_1''$ and $E_2''$. By means of the next MMA operation, there is again replacing, so that after the third MMA operation the final result of the modular multiplication is present in the form of the lowest portion $E_0$, the next higher portion $E_1$ and the highest portion $E_2$. This result E is thus obtained by the algorithm in FIG. 6a, specifically also portion-wise.

The result portions $E_2$, $E_1$ and $E_0$ replace $A_2$, $A_1$ and $A_0$ in the working memory, so that the result of a previous modular multiplication step now provides the new multiplier A for the next modular multiplication step, which will again be performed in the same way, wherein now, however, the original operand A is replaced by the newly calculated operand E.

In this algorithm, besides the already known MMA algorithm, a variation of it, namely MMA' is used. Roughly, the difference between the two algorithms is given in the formula MMA'=MMA−N. They are defined as shown in FIGS. 7a and 7b.

Figures 7C, 8A:
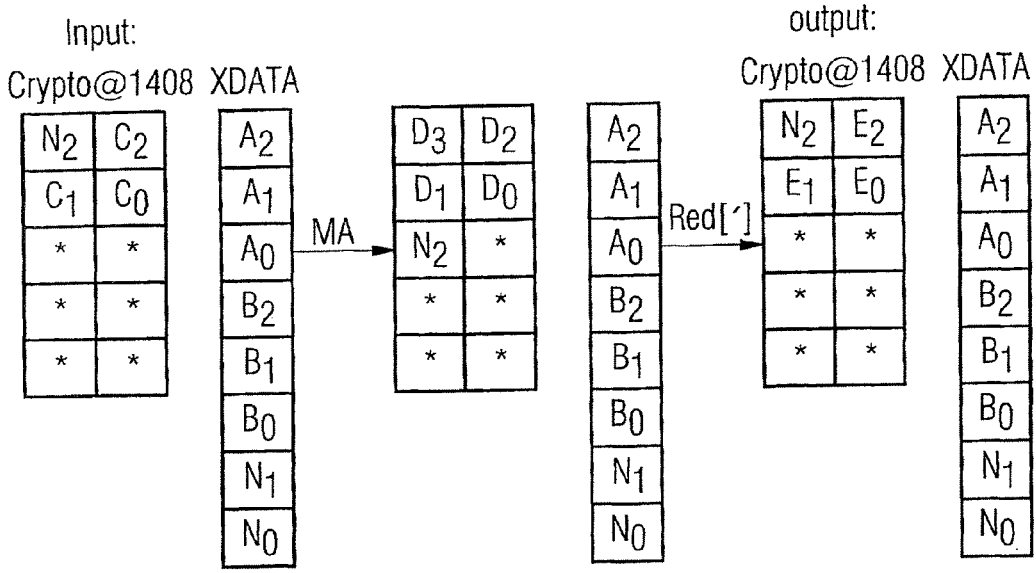
FIG. 7c shows a register implementation of the MMA operation.
FIG. 8a shows a preferred implementation of the MMA operation.

The register implementation is illustrated in FIG. 7c.

Both variations use the algorithms $MA_Z$ and $Red_Z$, wherein the last one again has two variants, namely $Red_Z$ itself and $Red'_Z$. Roughly, the difference between the two algorithms is given in the formula Red'=Red−N.

First the algorithm $MA_Z$ will be discussed. The algorithm is illustrated in FIG. 8a.

Figure 8B:
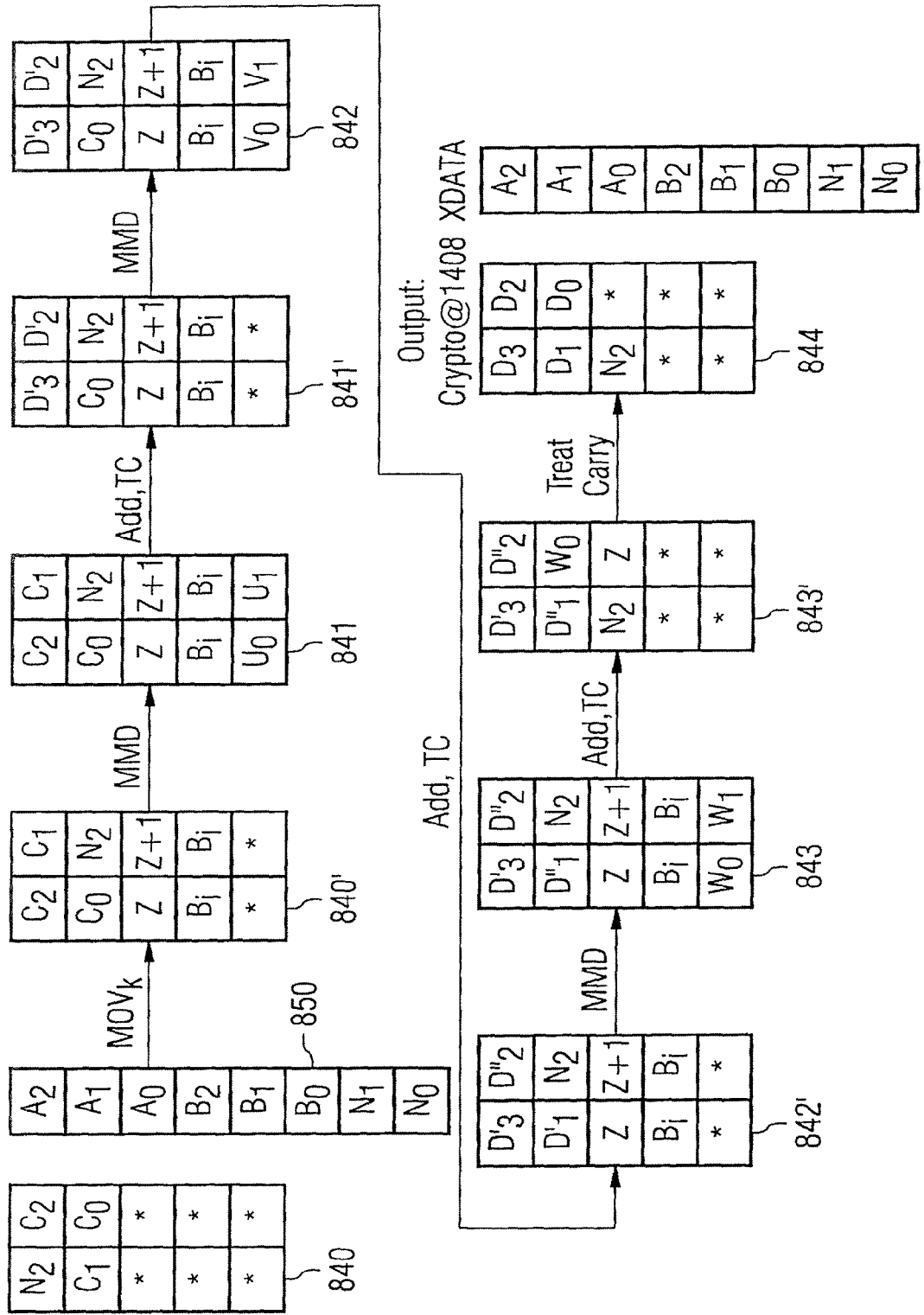
Figure 8C:
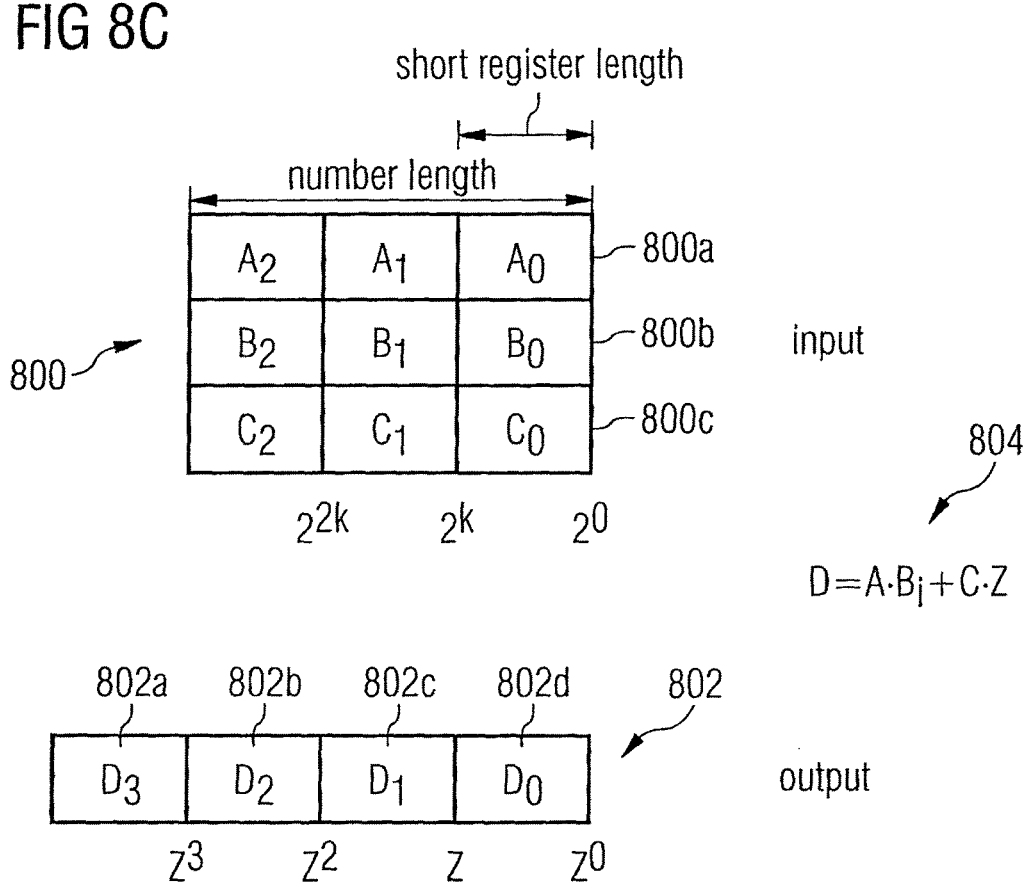
FIG. 8c shows a schematic representation of the input and output operands in the present invention.
Figure 8D:
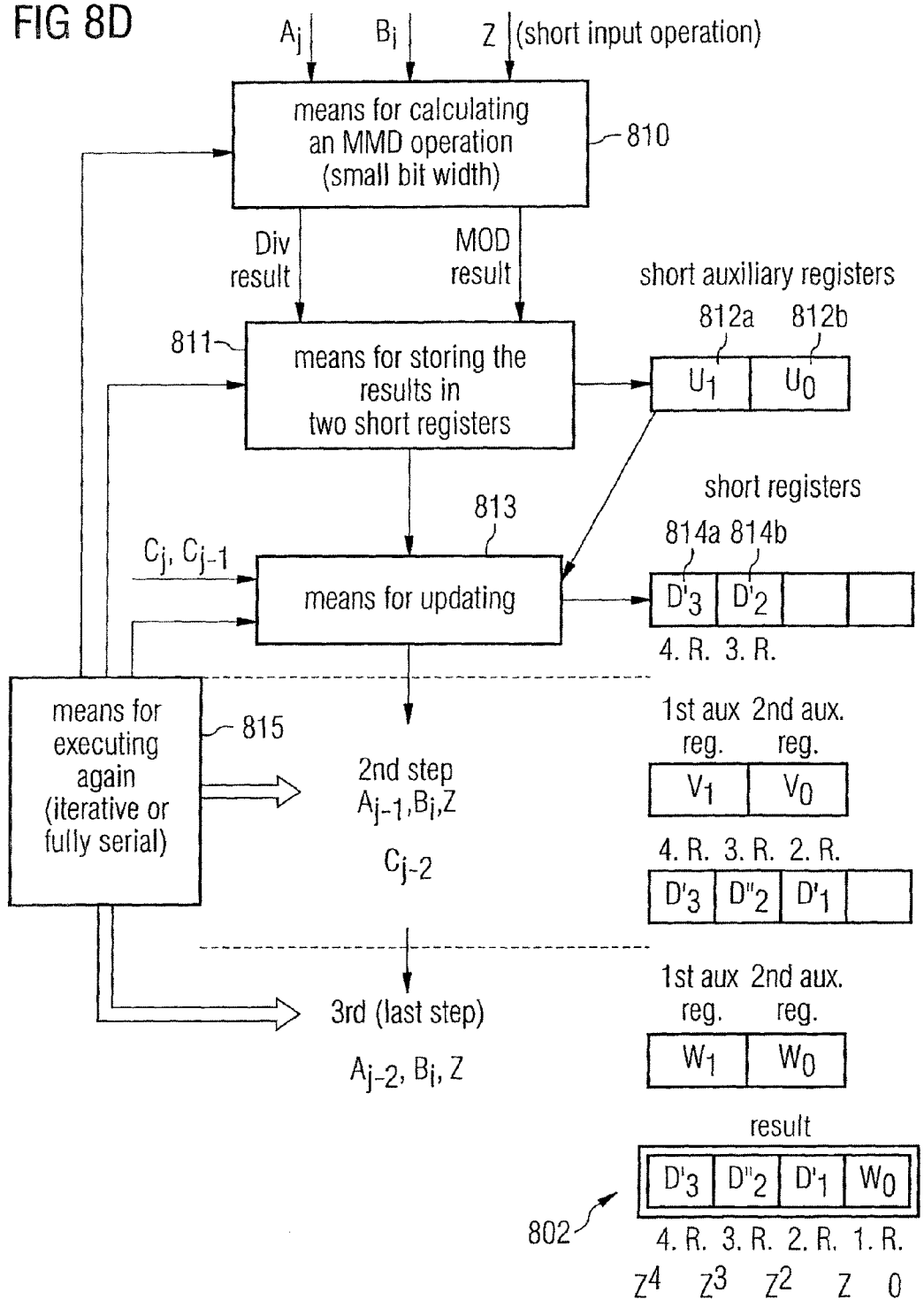
FIG. 8d shows a schematic block circuit diagram of the method and the device of the present invention.

The register implementation of the algorithm of FIG. 8a is illustrated in FIG. 8b. A preferred implementation of the inventive concept illustrated algorithmically in FIG. 8a is shown in FIG. 8d, wherein the register movements referred to in FIG. 8d are summarized in FIG. 8c, and wherein FIG. 8e gives an example of the inventive multiplication addition algorithm and the use of the two auxiliary registers and the four result registers. Before discussing the algorithm in detail, the meaning of the term "short register length" and "long number length" is first illustrated with respect to FIG. 8c. For this, a register block 800 is illustrated, which includes nine registers only for reasons of clarity. Each register of these nine registers has a certain number length and/or a number of binary digits and may thus store maximally one portion $A_i$, $B_i$, $C_i$ of the operand A, the operand B and the operand C. In the example shown here, each operand is divided into three portions. The index i thus has the values 0, 1, 2.

Considering each register for itself, each register has a number between zero and $2^{k-1}$. If, however, the least significant bit of a register is given a certain initial significance (and/or valency) per convention, which is common in calculating unit technology, a large register may, so to speak, be imitated by correspondingly interpreting the numbers in registers from these small registers. Equally, a row of the register block at 800 in FIG. 8c could include a single large register having a length equal to three times a short register length. In this case, the middle short register, in which there is stored $A_1$ or $B_1$ or $C_1$, would have to be given, for example, an initial significance of $2^k$ and/or generally speaking an initial significance of a number Z (the fourth operand), while the initial significance of the corresponding least significant register, in which there is stored $A_0$, $B_0$, $C_0$, would be $2^0$. Correspondingly, the initial significance of a register in which there is stored $A_2$, $B_2$ or $C_2$ would be $2^{2k}$ or $Z^2$.

Corresponding conventions also apply to the individual output or result registers 802. They are again four registers with short register length in which there is respectively stored a portion $D_0$, $D_1$, $D_2$ or $D_3$ of the result value, wherein, depending on the position and/or identification of a short register, there is an initial significance of $2^0$, Z, $Z^2$ or $Z^3$, which has to be given to register content when the total (absolute) number and not only a number within a register is important.

At 804, there is shown an example of a multiplication addition operation, i.e. an operation between a first operand A, a second operand $B_i$, a third operand C and a fourth operand Z, wherein the first operand A and the third operand C are longer than the second operand $B_i$ or the fourth operand Z, and wherein portions of the first operand A or the third operand C are shorter than the first operand or the third operand per se. In the individual result registers 802a, 802b, 802c, 802d, there are stored iteratively calculated results, wherein updated MOD and/or DIV results of 3 MMD operations are stored in the registers 802a to 802c, and wherein the MOD result of the last (third) MMD operation is stored in the least significant short register 802d.

It is to be noted that any number of iterations may be used, i.e. that the long operands do not necessarily have to be divided into three portions, but may also be divided into two portions or into more than three portions, such as four or five portions. The number of iterations would then increase correspondingly. The number of auxiliary registers, however, will not increase. The number of required result registers would, however, increase according to the number of portions (+1). Still, an embodiment will be discussed below in which the long operands are divided into three portions of the same length, although the division of equal length is not necessarily required either. Although it results in a regular and well-manageable value situation of the initial significances of the individual registers, it is not necessarily a precondition. If portions of unequal length are selected, the initial significances of the individual short registers are set correspondingly, so that the "combining" of the result number from the individual portions is done correctly.

FIG. 8d illustrates the inventive concept with respect to a device and/or a method for calculating the result 802 by a multiplication addition operation 804 between a first operand A, a second operand $B_i$, a third operand C and a fourth operand Z, wherein the first and the third operands are longer than the second or the fourth operands, and wherein portions of the first or third operands are shorter than the fourth operand, i.e. they are, so to speak, the number indicating the initial significance.

The inventive device includes means 810 for calculating results of an MMD operation using the second operand, a more significant portion $A_2$ of the first operand and the fourth operand as modulus. These results include a DIV result providing the integer quotient of the operation, and an MOD result yielding the remainder of the integer division. These two results are provided to means 811 for storing the results, as shown in FIG. 8d. The means 811 is designed to store the results in the form of $U_1$ and $U_0$ in two short auxiliary registers 812a, 812b. The values stored in the short auxiliary registers, i.e. the results of the first MMD operation, are then provided to means 813 for updating the DIV result and the MOD result, wherein the update is performed using an addition of portions of the third operand. This update thus takes into account the addition term of the multiplication addition operation, as shown at 804 in FIG. 8c. The means 813 for updating is further designed to store updated results in a fourth result register 814a and a third results register 814b. The memory contents of the result register 814a are designated $D_3'$, while the portion of the result in the third result register is designated $D_2'$.

Depending on the appearance of the portions of the third operand C, the update in means 813 for updating results in a change of the supplied DIV result or the supplied MOD result or not. If the whole situation of the third operand is, for example, so that the DIV result or the MOD result of the first MMD operation is not changed, the corresponding value $U_1$ or $U_0$ in the auxiliary register 812a, 812b may be entered directly into a result register 814a, 814b. In this case, "updating" thus means that there has been no change of the result of the MMD operation. If, however, the third operand is such that the results of the MMD operation executed at 810 are changed, this results in a change of the auxiliary register values and in the changed auxiliary registers values being fed into corresponding result registers, such as 814a, 814b.

The present invention further includes means 815 for executing the MMD operation and the update again using another portion of the first operand, until all portions of the first operand are processed. The registers in which updated results are stored, and a register in which an MOD result of a last MMD operation is stored, then together provide the result of the multiplication addition operation according to the initial significance associated with the registers, as shown at 802.

The means 815 for executing again may be designed as iteration means that again activates the means 810, 811, 813 in a cyclic processing, but provides them with the corresponding other portions of the operands. Alternatively, when no iterative processing is desired, the means 815 for executing again may also be designed as simple doubling and/or tripling of the elements 810, 811, 813, which, however, are fed with correspondingly different values. For reasons of efficiency, however, the embodiment is preferred in which the means 815 for executing again drives the existing means 810, 811, 813 again, but with other input operands, until all portions of the first operand A are processed.

In the first step, $A_j$, $B_i$ and Z as well as $C_j$, $C_{j-1}$ are required as input operands.

In the second step, $A_{j-1}$, Z and $C_{j-2}$ are required as input operands.

In the third step, $A_{j-1}$, $B_i$ and Z are required as input operands.

If there is a division into only two portions, the calculation is completed after as few as two steps.

If, however, there is a division into more than three portions, $C_{j-3}$ will be used in addition to $C_{j-2}$ in the second step, and $A_{j-3}$ and $C_{j-4}$ will be used in the third step, and there would be a fourth and last step, in which $A_{j-4}$ would be used.

In this case, the result register would also have five individual short result registers, instead of the four individual result registers used in the case of three portions, in which the result values $D_3'$, $D_2''$ and $D_0$ are stored, wherein $W_0$ represents the MOD result of the last MMD operation, while the other three inputs into the whole result register 802 will be updated MMD results.

For the purpose of illustration, FIG. 8e illustrates an example and the three iteration steps for calculating the result of the multiplication addition operation with respect to an arbitrarily selected example.

For each step, the loading of the two auxiliary registers 812a, 812b and the contents of the result registers 802a to 802d obtained in these steps are illustrated. In the embodiment shown in FIG. 8e, only registers are required that may store a single decimal digit, and there are never required registers that have to store two decimal digits.

The register implementation is illustrated in FIG. 8b.

The main part of the algorithm thus consists of the MMD operations. Their implementation will be discussed in a following section. In addition to these, there are an elementary operation, namely adding components of integers and treating a possible carry.

$$(D'_3|D'_2)_Z := (C_2+U_1, C_1+U_0)_Z$$

means $$D'_2 := C_1+U_0$$

$$D'_3 := C_2+U_1$$

$$(D'_3, D'_2) := TC(D'_3, D'_2)$$

and $$(D''_2|D'_1)_Z := (D'_2+V_1, C_0+V_0)_Z$$

means $$D'_1 := C_0+V_0$$

$$D''_2 := D'_2+V_1$$

$$(D''_2, D'_1) := TC(D''_2, D'_1)$$

$$[(D'_3, D''_2) := TC(D'_3, D''_2)]$$

Here, the last action was set in brackets, since this is not really necessary: If this was necessary, the carry would be resolved in the last step. Namely, as $D''_2 \leq 2(Z-1)$, it will still be possible to hold the carry from the next step, and it can be resolved without additional problems. Finally $$(D''_1|D_0) := (D'_1+W_1, W_0)_Z$$

can be implemented as $$D_0 := W_0$$

$$D''_1 := D'_1+W_1$$

$$(D''_2, D''_1) := TC(D''_2, D''_1)$$

The algorithm TC is nothing else than simply treating a carry in the Z-ary integer representation, as shown in FIG. 9a.

In the preferred embodiment of the present invention, the algorithm TC is performed as part of the updating step, i.e. after the performed addition and prior to the loading of the result registers 814a, 814b in FIG. 8d. The algorithm for TC is shown in FIG. 9a. The algorithm TC only steps in when the second input X, i.e. the value of $(C_1+U_0)$ in the algorithm shown in FIG. 8a, is larger than Z. If this value is less than Z, there is no carry, and the function TC of FIG. 9a is transparent. If, however, it is the case that X is larger than Z or equal to Z, Z is subtracted from X, and Y is incremented by "+1" to take the carry into account. The value Y then represents the contents of the fourth register $D_3'$, while the value X represents the contents $D_2'$ of the third register 814b in FIG. 8d.

It is to be noted that, when such numbers are calculated in which there is never a carry, the TC function is not required. For universal applicability, however, this function is preferred and is used within the means for updating after the addition of portions of the third operand C.

Next, a process of the inventive method is illustrated in more detail with respect to a preferred register implementation. A register situation of a calculating unit with 5 long registers divided into ten short registers is assumed. The register loading at the start of the algorithm is illustrated at 840 in FIG. 8b. It can be seen that only the top four registers are loaded with $N_2$, $C_1$, $C_2$ and $C_0$. $N_2$ is the top portion of the transformed modulus, which itself is not required for the multiplication addition calculation, but which is already in the register due to the previous and/or subsequent calculations. In principle, however, it is not required for the execution of the multiplication addition operation.

Furthermore, the state of the external memory and/or working memory XDATA 850 is shown in FIG. 8b. The external memory 850 includes three portions of the first operand A, three portions of the second operand B, and the middle and lowest portions of the transformed modulus N, which, however, are not required for the multiplication addition operation either.

In a memory loading step $Mov_k$, the internal register memory is now loaded, namely with the fourth operand Z in the fourth row and the left column, shown at 840'. The numbers Z+1 and the new loading of $B_i$ into a further short memory are not required for the multiplication addition operation in its basic execution. Then the first MMD operation is performed by the means 810. The results $U_0$, $U_1$ are fed into the two still free register memories, as illustrated at 841. Now there is an update, which is illustrated by an addition function and a TC function in FIG. 8b. Here, the registers $C_2$ and $C_1$ are overwritten with the values $D_3'$ and $D_2'$. This is possible because the values $C_2$ and $C_1$ are no longer needed, as can be seen in FIG. 8a. Furthermore, the memory loading is illustrated in FIG. 8b after the first updating step (Add, TC) such that the two auxiliary registers in which $U_0$, $U_1$ were stored are again cleared, as illustrated at 841'.

Then, the second MMD operation is performed and the results $V_0$, $V_1$ are again stored into the two auxiliary registers, as can be seen at 842. Then there is an update, i.e. an addition operation and a TC operation are executed to achieve a memory loading 842'. It can be seen that the register memory in which $C_0$ was written has been overwritten by $D_1'$, because $C_0$ is no longer needed after the second update (Add, TC).

Furthermore, the third and last MMD operation is performed to obtain a loading of the register memory as shown at 843. Again, a loading of the two auxiliary registers by $W_0$ and $W_1$, i.e. the results of the MMD operation, is achieved, wherein then there is a last update to obtain a memory loading as illustrated at 843'. In the embodiment shown in FIG. 8b, the value $N_2$ was shifted, and $W_0$ was entered as least significant result register value.

A final treat carry step for the use of the contents of the memory, as shown at 843', results in the ultimate output state, illustrated at 844.

It is to be noted that the internal memory loading has been selected so that the processor, i.e. the means 810 for calculating the MMD operation or the means 813 for updating, which may be one and the same calculating unit or may be separate calculating units, always has to access only a single value in the external memory. In the first MMD step, this is the value $A_2$. In the second MMD step, this is the value $A_1$, and in the third MMD step, this is the value $A_0$.

In the case of a processor that does not execute any external access, but is to operate only with its internal registers, the value for $A_2$, $A_1$ and/or $A_0$ would have to be stored into an available short register prior to each execution of the MMD operation, or all three values could be loaded as part of $Mov_k$ at the beginning.

Later the algorithm for treating a negative carry (borrow), which is analogous to TC, will be used after a subtraction. It is shown in FIG. 9b.

The final reduction step only has to take care of the upper two parts of D, since the lower two parts have been treated in the last step, so $$(D_3|D_2|D_1|D_0)_Z := (D'_3, D''_2, D''_1, D_0)_Z$$

(also denoted as TC) is in fact implemented as $$D_1 := D''_1$$

$$(D_3, D_2) := TC(D''_3, D''_2)$$

Remember that $D_3$ may become positive or negative, so that it is "free floating".

Finally, a further part of the whole algorithm is the modular reduction step. It has to versions, one that computes the usual remainder $\epsilon[0, N[$ and one that computes the remainder decremented by N, i.e. $\epsilon[-N, 0]$. The two algorithms are shown in one step, since the differences only lie in the computation of $\bar{\epsilon}$ and in the final reduction (FIG. 9c).

The register implementation is illustrated in FIG. 9d.

Again, the main part of the algorithm consists of the three MMD operations. Their implementation will be discussed in a following section. The remaining part consists of the estimation of $\epsilon$, which will be discussed in a later section, and some elementary operations of addition or subtraction of components and treating possible carries or borrows.

The first two additions $Q'_0 := Q_0 + D_3$ and $D'_2 := D_2 + R_0$ are not subjected to any carry treatment. In any case, remark 7 has shown that $Q_0$ will not become much larger than Z. On the other hand, $D'_0$ may become as large as 2Z, but it is non-negative and therefore this integer has to be interpreted as unsigned integer!

With reference to FIG. 12, it is shown how to implement the next three lines together:

$$\epsilon := \text{estimate}(D'_2 - (Q'_0 N_1)_1 \text{ div } N_2)[+1]$$

$$D''_2 := D'_2 - \epsilon N_2$$

$$Q''_0 := Q'_0 + \epsilon$$

The subtraction $$(D'_1 | D'_0)_Z := (D_1 - U_1, D_0 - U_0)_Z$$

will be done similarly to the $MA_Z$ algorithm, with the difference that borrows have to be treated instead of carries. But note that, if $Q''_0 < 0$, then $U_1$ and $U_0$ are also negative, hence the subtraction is actually an addition, and carries have to be treated again:

```
D_0' := D_0 - U_0; D_1' := D_1 - U_1
if Q_0'' ≧ 0 then
    (D_1',D_0') := TB(D_1',D_0')
    (D_2',D_1') := TB(D_2',D_1')
else
    (D_1',D_0') := TC(D_1',D_0')
    (D_2',D_1') := TC(D_2',D_1')
end
```

Of course, there is a possibility to change the order of the operations. In the same way, the other subtraction $$(D'''_2 | D''_1)_Z := (D''_2 - V_1, D'_1 - V_0)_Z$$

is treated as:

```
D_1'' := D_1' - V_0; D_2''' := D_2'' - V_1
if Q_0'' ≧ 0 then
    (D_2''',D_1'') := TB(D_2''',D_1'')
else
    (D_2''',D_1'') := TC(D_2''',D_1'')
end
```

Remember that $D'''_2$ will not be resolved yet. This is done in the final reduction step following now:

In $\text{Red}_Z$, it is desired to get a result $E \in [0, N[$. But sometimes, the result is slightly larger than N or less than 0. In this case, N has to be subtracted or added once. In order to check whether E>N, E has to be subtracted from N. But unfortunately, N does not fully lie in the Crypto@1408. So $E_2-N_2$ is computed and there is a check whether this difference is $\geq 0$. If E>N, this is certainly the case. Note that also $E_2-N_2=0$ may be a hint that E>N, since it is always possible that $E_1>N_1$. However, this cannot be checked immediately, since the full N first has to be loaded into the Crypto@1408. It happens only in very few cases that $E_2=N_2$, while $E \leq N$. Since all this happens very rarely, one takes the time and loads the complete N into the Crypto@1408 and performs the final reduction: N is subtracted from E. If then the new integer $E_2 \geq 0$, this is the end. If $E_2$ becomes negative, N has to be added again. If $E_2$ was negative from the beginning—which also happens very rarely—then N is also loaded into the Crypto@1408 and added to E. This algorithm is formally given by

```
if E_2 - N_2 ≧ 0 then
    (E_2|E_1|E_0)_z := (E_2 - N_2, E_1 - N_1, E_0 - N_0)_z
end
if E_2 < 0 then
    (E_2|E_1|E_0)_z := (E_2 + N_2, E_1 + N_1, E_0 + N_0)_z
end
```

Note that normally, in 99.9% of all cases, both if—conditions will not be fulfilled. So the implementation should consider this fact. It should be avoided to load the full N into the Crypto@1408, unless one of the conditions is true, because this needs a lot of time! For $\text{Red}'_Z$, the final reduction is quite similar.

```
if - N_2 - E_2 < 0 then
    (E_2|E_1|E_0)_z := (E_2 + N_2, E_1 + N_1, E_0 + N_0)_z
end
if E_2 ≧ 0 then
    (E_2|E_1|E_0)_z := (E_2 - N_2, E_1 - N_1, E_0 - N_0)_z
end
```

In both cases, one always has to be aware of carries and borrows and resolve them like in the additions and subtractions described earlier in this section. Finally, note the following important remark.

Remark 11: Because of equation (3), $Q''_0 \in [-Z-1, Z]$. Since in the second and third MMD operations the second factor is definitely reduced mod Z, the product $Q''_0 \cdot N_i$ will always have an absolute value $\leq (Z+1)(Z-1)=Z^2-1$.

Implementation of $MMD_k$

Input for the MMD algorithm is a transformed modulus N (in this case this will be $N_2$ or Z), the multiplicand X (in this case $B_i$, $D_3$, $Q''_0$) and the multiplier Y ($A_i$, Z, $Z-N_2$ and $N_i$), which in most but not all cases will lie outside the Crypto@1408.

1. If #N=: k>704-8-1=695 (sign bit, not counted), the MMD operation has to be computed in long mode of the Crypto@1408. Otherwise, the parallel mode discussed below may be used. In long mode, the algorithm is given in FIG. 10*a*.

For the Crypto@1408, the algorithm is illustrated in the following FIG. 10*b*.

2. At least in one case, the algorithm will be needed for a negative multiplicand. But this is not a problem, as long as $X \in ]-N, 0]$: In this case, $(Q, R) := MMD(-X, Y; N)$ is computed and $(-Q+1, N-R)$ is returned, if R>0, and $(-Q, -R)$, if R=0. This is legitimate by the following observation: If $$-X \cdot Y = Q \cdot N + R, \text{ with } R \in [0, N[,$$

then $$X \cdot Y = -Q \cdot N - R = (-Q+1) \cdot N + (N-R).$$

In fact, in this case, it will be sufficient to just return $(-Q, -R)$, since this algorithm works in this part with negative remainder R.

3. It is even not really necessary that X and $Y \in [0, N[$ (or more generally in $]-N, N[$). It is sufficient that the product $X \cdot Y$ lies in $[0, N^2[$. Therefore, it may be allowed that X or Y is a little bit larger than N, as long as Crypto@1408 does not interpret the integer in a wrong way (sign bit).

the product $X \cdot Y$ is not too big, i.e. lies in $[0, N^2[$.

Figure 11A:
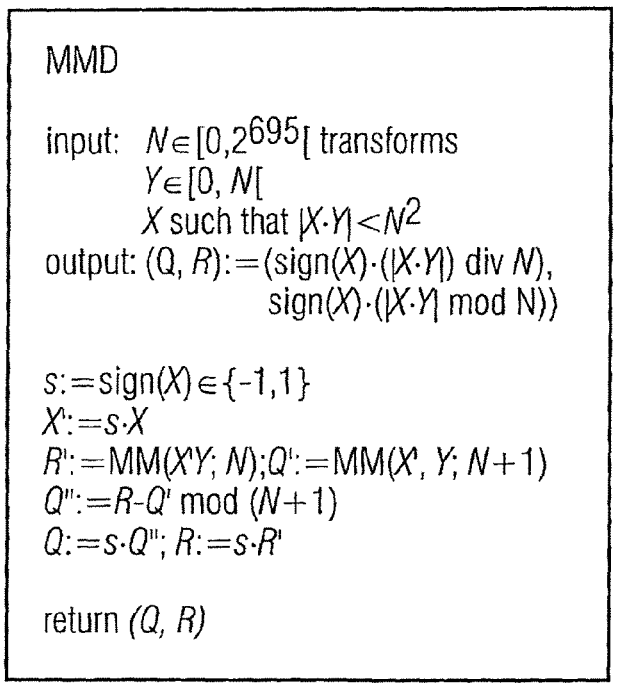
FIG. 11a shows an implementation of the MMD operation.

In FIG. 11*a*, the algorithm is given in the way it is preferably used.

Figure 11B:
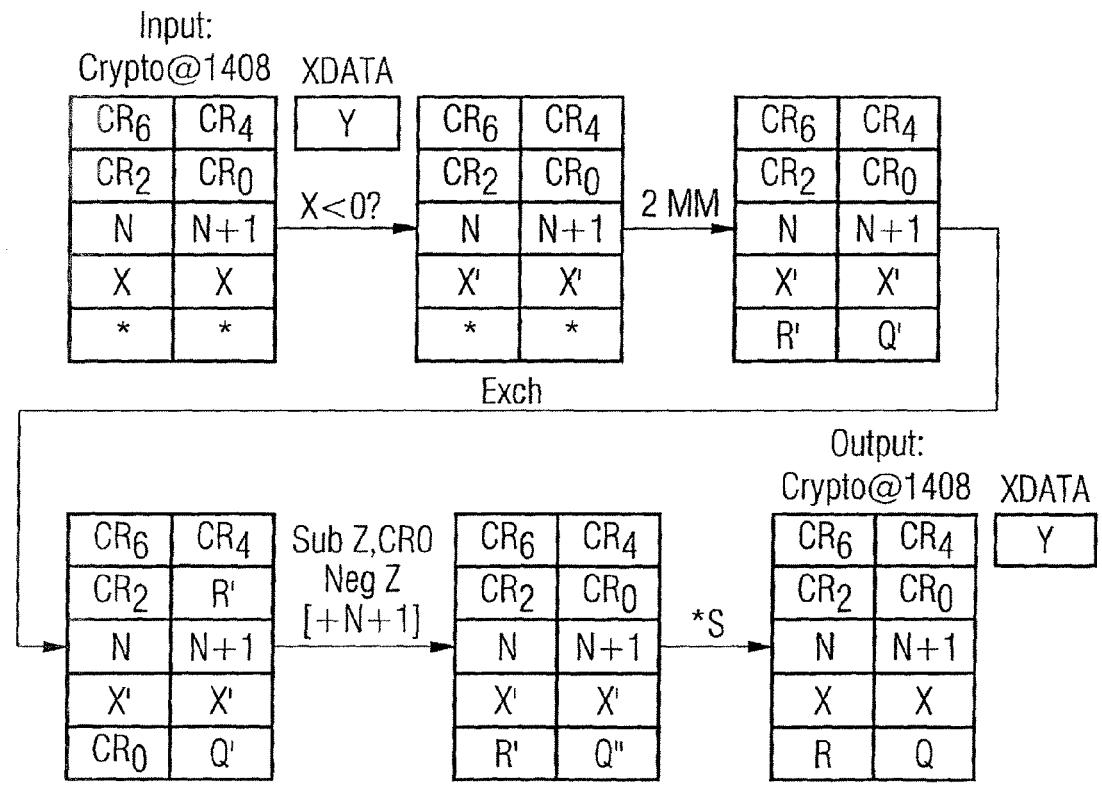

The algorithm implemented on Crypto@1408 is illustrated in FIG. 11*b*.

Making the Side Computation

In this section, there is given an implementation of the three lines $$\epsilon := \text{estimate}(D'_2 - (Q'_0 N_1)_1 \text{ div } N_2)$$

$$D''_2 := D'_2 - \epsilon N_2$$

$$Q''_0 := Q'_0 + \epsilon$$

of Red.

The main point in this implementation is the estimation of $D'_2 - (Q'_0 N_1)_1 \text{ div } N_2$. By the same technique already used several times an approximation of a division may be obtained by using only the top bits of a dividend and divisor. In this case, the 16 top bits (including sign bit) will be used, i.e.:

$$D'^{top}_2 := D'_2 \text{ div } 2^{k-16}$$

$$Q'^{top}_0 := Q'_0 \text{ div } 2^{k-16}$$

$$N^{top}_1 := N'_1 \text{ div } 2^{k-16}$$

$$Z^{top} := Z \text{ div } 2^{k-16}$$

$$N^{top}_2 := Z^{top} N_2 \text{ div } 2^{k-16}$$

Since $(\ldots)_1$ in $(Q'_0 N_1)_1$ means division by Z, the fraction is multiplied by Z and there is hence an approximation in the following way:

$$\epsilon := (Z^{top} D'_2{}^{top} - Q'_0{}^{top} N_1{}^{top}) \text{div } N_2{}^{top}$$

$D'_2{}^{top}$ and $Q'_0{}^{top}$ are obtained by reading the most significant word of $D_2$ and $Q'_0$. The top two bytes—sign extended—are loaded into some CPU register. Also $N_1{}^{top}$ is prepared in the same way, but in this case this has to be done only once during the whole exponentiation. (Pre-computation!) Then the product $Q'_0{}^{top} N_1{}^{top}$ will be computed. It is a 32 bit word and it is subtracted from $Z^{top} D'_2{}^{top}$. Call the result X. This result will be compared with $N_2{}^{top}$, which is prepared in the same way as $N_1{}^{top}$, but with an additional factor of $Z^{top}$. The rest is obvious and shown in FIG. 11.

Remark 12: Note that for Red' one has to add one additional block $$D'_2 := D'_2 - N_2$$

$$Q'_0 := Q'_0 + 1$$

in any case.
Pre-Computation

The pre-computation gets the base B* and the modulus N* for the exponentiation. N* has a bit length K, i.e. $N^* \in [2^{K-1}, 2^K[$.

$$(N'_2 | N'_1 | N'_0)_Z := N^*$$

$$B_2 | B_1 | B_0)_Z := B^*$$

Since the pre-computation is not relevant for the performance, the implementation aspects will not be discussed in too much detail. Only some remarks and comments regarding these points:
Transforming N* into $(N_2 | N_1 | N_0)$:

Now set $W := 2^{k-1}$ the largest power of two to less than Z and write $N^* = (N^*_2 | N^*_1 | N^*_0)_w$, i.e. divide N* into three (k−1) bit blocks. The transformation into Z-ary representation $(N_2 | N_1 | N_0) := N^*$ is given in FIG. 13a:

Note that Z is transformed, so that the MMD implementation of FIGS. 11a and 11b may really be used. The two addition parts are done exactly like in the main implementation presented starting from FIG. 6: Make the addition component-wise and treat the carry!
Transforming B* into $(B_2 | B_1 | B_0)_Z$:

This works exactly in the same way as in the last point.
Making the Final Reduction (Post-Computation)

The final reduction takes the output $(A_2 | A_1 | A_0)_Z$ of the last modular multiplication of the pure exponentiation, reduces this number modulo $N^* = (N'_2 | N'_1 | N'_0)_Z := N^*$ and transforms it back into the binary representation A*. The result is 1. $(A'_2 | A'_1 | A'_0)_Z := (A_2 | A_1 | A_0)_Z \mod (N'_2 | N'_1 | N'_0)_Z$
2. $A^* := (A'_2 | A'_1 | A'_0)_Z$ wherein $(N'_2 | N'_1 | N'_0)$ is known from section 5.5.
For 1. The Reduction will be done in the already known way: $A := A - [A \text{ div } N] \cdot N$, so the algorithm can be given as shown in FIG. 13c.

The division is the one from the last section, and the entire already known technique is used.
For 2. Transforming into Binary Form This is actually just the computation $$A := A'_2 \cdot Z^2 + A'_1 \cdot Z + A'_0$$

Three different methods to implement a 2048-bit RSA computation have been described. Furthermore, the performance of such an implementation of the algorithm was evaluated, taking into account some system aspects which are performance-dominating, such as moving integers into and out of Crypto@1408. It was found that in terms of speed and usage of external memory, the inventive preferred algorithm is the best one. Although for m=3 it is only suitable to implement RSA up to 2048 bits (+16 for randomization). If there is a need for longer bit lengths, then the Algorithm II (Fischer-Sedlak-Seifert with MMD) seems to be the best reasonable method. Alternatively, m=4, 5, . . . may also be chosen.

Depending on the circumstances, the inventive method for calculating a result may be implemented in hardware or in software. The implementation may be done on a digital storage medium, particularly a floppy disk or CD with control signals that may be read out electronically, which may cooperate with a programmable computer system so that the method is executed. Generally, the invention thus also consists in a computer program product with a program code stored on a machine-readable carrier for performing an inventive method when the computer program products runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

[1] W. Fischer, "Vorrichtung und Verfahren zum Berechnen eines Ergebnisses aus einer Division," DE patent #102,05,713, Aug. 7, 2003.

[2] W. Fischer, H. Sedlak, J. P. Seifert, "Vorrichtung und Verfahren zum Berechnen eines Ergebnisses einer modularen Multiplikation," DE patent #102,19,158, Dec. 9, 2004.

[3] W. Fischer, J. P. Seifert, "Vorrichtung und Verfahren zum Umrechnen eines Termes," DE patent application #102,19,161,A1, Nov. 20, 2003.

[4] W. Fischer, H. Sedlak, J. P. Seifert, "Vorrichtung und Verfahren zum Berechnen eines ganzzahligen Quotienten," DE patent #102,19,164, Dec. 2, 2004.

[5] W. Fischer, H. Sedlak, J. P. Seifert, "Vorrichtung und Verfahren zum Berechnen einer Multiplikation mit der Verschiebung des Multiplikanden, insbesondere bei der kryptographischen Berechnung," DE patent #102,60,655, Jun. 24, 2004.

[6] W. Fischer, H. Sedlak, J. P. Seifert, "Modulare Multiplikation mit paralleler Berechnung der Look-Ahead-Parameter u.s. bei der kryptographischen Berechnung," DE patent #102,60,660, Jun. 9, 2004.

[7] W. Fischer, J. P. Seifert, "Increasing the bitlength of a crypto-coprocessor," Proc. of CHES '02, Springer LNCS, Vol. 2523, pp. 71-81, 2002.

[8] W. Fischer, J. P. Seifert, "Unfolded modular multiplication," Proc. of ISAAC '03, Springer LNCS, 2003.

[9] A. Menezes, P. van Oorschot, S. Vanstone, "Handbook of Applied Cryptography," CRC Press, 1997.

[10] P. L. Montgomery, "Modular multiplication without trial division," Math. of Computation, 44:519-521, 1985.

[11] H. Sedlak, "The RSA cryptographic Processor: The first High Speed One-Chip Solution," Proc. of EUROCRYPT '87, Springer LNCS, Vol. 293, pp. 95-105, 198.

What is claimed is:

1. A device for calculating a result of a multiplication addition operation between a first operand, a second operand, a third operand and a fourth operand, comprising:

a calculator configured to calculate results of a plurality of Mult-Mod-Div- (MMD-) operations using the second operand, using portions of the first operand and using the fourth operand as a modulus to obtain the result of the multiplication addition operation, wherein each Mult-Mod-Div-operation of the plurality of Mult-Mod-Div-operations is configured:

to receive, as an input, the fourth operand, a corresponding portion of the first operand and the second operand, to output, as a first result, a result of an integer division of a product of the corresponding portion of the first operand and the second operand by the fourth operand, and to output, as a second result, a result of a modular reduction of the product of the corresponding portion of the first operand and the second operand, where the fourth operand is a modulus of the modular reduction, and wherein the first and third operands are longer than the second operand or the fourth operand, and wherein the portions of the first operand are equal to or shorter than the fourth operand, and wherein the calculator comprises a hardware implementation.

2. The device of claim 1, wherein the calculator comprises:

a result calculator of an MMD operation using the second operand, a more significant portion of the first operand and the fourth operand as modulus, and for storing a DIV result in a first auxiliary register and an MOD result in a second auxiliary register, wherein the device further comprises:

a unit for updating the DIV result and the MOD result using an addition of at least one portion of the third operand and for storing updated results in a fourth result register and a third result register; and wherein the calculator further comprises:

a unit for executing again the MMD operation and the updating using another portion of the first operand, until all portions of the first operand are processed, wherein result registers in which updated results of an MMD operation are stored and a register in which an MOD result of a last MMD operation is stored together represent the result.

3. The device of claim 2, wherein the result registers each comprise less register digits than the first operand or the third operand comprise digits.

4. The device of claim 2, wherein the first operand or the third operand is divided into a plurality of portions each comprising a number of digits less than or equal to a number of digits of the fourth operand, and wherein the result registers comprise less register digits than required to store two portions in one register.

5. The device of claim 1, wherein the calculator for the MMD operation is formed to provide, as a DIV result, an integer indicating how often a product of a more significant portion of the first operand and the second operand is integer-dividable by the fourth operand, and wherein the MOD operation indicates how large the remainder is that remains in the integer division.

6. The device of claim 2, wherein the unit for updating is formed to calculate the sum of the most significant portion of a third operand and the DIV result, and to calculate the sum of a less significant portion and the MOD result, and to get updated results from acquired sum values, wherein the unit for executing again is formed to calculate a sum of contents of the third result register and a DIV result of a second MMD operation in another execution of updating, and to calculate a sum of a least significant portion of the third operand and an MOD result of the second MMD operation, and to get the updated results for the third result register and a second result register from acquired results, and wherein the unit for executing again is formed to get a sum of the value of the second result register and a DIV result of a third MMD operation as well as an MOD result of the third MMD operation, and to get therefrom at least one updated result for the second result register.

7. The device of claim 2, wherein the unit for updating is formed to perform a treat carry function formed to subtract the fourth operand from a first input value when the first input value is larger than the fourth operand, to get a first output value, and to increment a second input value by 1 in this case to get a second output value, wherein the second output value represents a more significant updated result, and the first output value represents a less significant updated result.

8. The device of claim 1, wherein the device is formed to use a value less than 0 as the third operand.

9. The device of claim 1, formed to divide operands into portions of the same length, so that all portions comprise the same number of digits.

10. The device of claim 2, wherein the unit for executing again is formed to overwrite values in the first auxiliary register and the second auxiliary register by results of another MMD operation.

11. The device of claim 1, formed to load a portion of the first operand from an external memory, while other operands necessary for a calculating operation are acquired from a processor-internal register.

12. The device of claim 2, wherein the calculator, the unit for updating, and the unit for executing again are formed to execute the multiplication addition operation as follows:

$$\begin{aligned}
&\text{input: } A \in [0, N[ \\
&\qquad B_i \in [0, Z[ \\
&\qquad C \in [-N, 0] \\
&\text{output: } D := A \cdot B_i + C \cdot Z \in [-NZ, NZ] \\
&(D_3|D_2|D_1|D_0)_z := (C_2|C_1|C_0|0)_z \\
&\text{for } j := 2 \text{ to } 0 \text{ execute} \\
&\qquad ((BA_{ij})_1, (BA_{ij})_0) := \text{MMD } (B_i, A_j; Z) \\
&\qquad D_j := D_j + (BA_{ij})_0 \\
&\qquad D_{j+1} := D_{j+1} + (BA_{ij})_1 \\
&\qquad \text{treat carry:} \\
&\qquad\qquad \text{if } D_j \geq Z \text{ then [only for } j = 1, 2] \\
&\qquad\qquad\qquad D_j := D_j - Z \\
&\qquad\qquad\qquad D_{j+1} := D_{j+1} + 1 \\
&\qquad\qquad \text{end} \\
&\qquad\qquad \text{if } D_{j+1} \geq Z \text{ then [only for } j = 0, 1] \\
&\qquad\qquad\qquad D_{j+1} := D_{j+1} - Z \\
&\qquad\qquad\qquad D_{j+2} := D_{j+2} + 1 \\
&\qquad\qquad \text{end} \\
&\text{end}
\end{aligned}$$

return D, wherein A is the multiplier, $B_i$ is a portion of the multiplicand, C is an intermediate result of a previous step, N is the modulus, $Z=2^i$, wherein i represents a number of digits of the portion, D is a result of the multiplication addition, i and j are running indices, MMD represents a MultiModDiv operation, and treat carry is a carry treatment function.

13. A device for calculating a result of a modular multiplication with a multiplier, a multiplicand and a modulus, comprising:
   a unit for providing the multiplicand in at least three portions, wherein each portion comprises a number of digits less than half the number of digits of the multiplicand, and wherein the at least three portions include all digits of the multiplicand; and
   a sequential calculator, wherein the sequential calculator is formed
   to calculate a first intermediate result using a more significant portion of the multiplicand,
   to calculate a second intermediate result using a less significant portion of the multiplicand and the first intermediate result, and
   to calculate and store a third intermediate result using a still less significant portion of the multiplicand and the second intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions,
   wherein the sequential calculator comprises a device for calculating a result of a multiplication addition operation between a first operand, a second operand, a third operand and a fourth operand, wherein the first and third operands are longer than the second operand or the fourth operand, and wherein portions of the first operand are equal to or shorter than the fourth operand, the device for calculating comprising:
      a calculator configured for calculating results of a plurality of Mult-Mod-Div- (MMD-) operations using the second operand, using the portions of the first operand and using the fourth operand as a modulus to obtain the result of the multiplication addition operation, wherein each Mult-Mod-Div-operation of the plurality of Mult-Mod-Div-operations is configured:
         to receive, as an input, the fourth operand, a corresponding portion of the first operand and the second operand,
         to output, as a first result, a result of an integer division of a product of the corresponding portion of the first operand and the second operand by the fourth operand, and
         to output, as a second result, a result of a modular reduction of the product of the corresponding portion of the first operand and the second operand, where the fourth operand is a modulus of the modular reduction, and
   wherein the first operand corresponds to the multiplier, the second operand is the portion of the multiplicand, the third operand is an intermediate result of a sequential calculation previous in time, and the fourth operand is derived from the number of digits that a portion comprises, and
   wherein at least one of the group consisting of the unit, the sequential calculator and the calculator comprises a hardware implementation.

14. The device of claim 13, wherein the calculator is formed to execute the following calculation:

$$C_1 := MMA_Z(A, B_2, 0; N) - N$$

$$C_2 := MMA_Z(A, B_1, C_1; N) - N$$

$$C_3 := MMA_Z(A, B_0, C_2; N),$$

wherein N is the modulus, A is the multiplier, $B_2$ is the most significant portion of the multiplicand, $B_1$ is a less significant portion of the multiplicand, $B_0$ is a least significant portion of the multiplicand, $C_1$ is the first intermediate result, $C_2$ is the second intermediate result, $C_3$ is the third intermediate result, and $MMA_Z$ represents a MultModAdd operation with a respective portion of the multiplicand.

15. The device of claim 14, wherein the MMA operation comprises a reduction operation in addition to the multiplication addition operation.

16. The device of claim 13, wherein the unit for providing is formed to comprise at least one register comprising a length less than a length of the whole multiplicand, but larger than or equal to a portion of the multiplicand, and wherein the calculator is formed to load a portion of the multiplicand into the register during calculation.

17. The device of claim 13, wherein the unit for providing is formed to also divide the multiplier and the modulus into at least three portions each, and wherein the calculator is formed to use both the portions of the multiplier and the modulus for one or more calculations.

18. The device of claim 13, wherein the sequential calculator is formed to comprise ten or less registers with a length at least as large as a length of a portion and less than a whole length of the modulus.

19. The device of claim 13, wherein the sequential calculator is formed to execute the following equation:

$$C = [(A \cdot B_2 \bmod N) \cdot Z + A \cdot B_1 \bmod N] \cdot Z + A \cdot B_0 \bmod N,$$

wherein C is the third intermediate result, A is the multiplier, $Z=2^i$, wherein i is a number of digits of the portions, $B_2$ is the most significant portion of the multiplicand, $B_1$ is a less significant portion of the multiplicand, $B_0$ is the least significant portion of the multiplicand, N is the modulus, and mod indicates a modular reduction operation.

20. The device of claim 13, formed as a configurable calculating unit, wherein the configurable calculating unit comprises a bit-slice structure, wherein each bit slice comprises a calculating unit part and a register part, wherein the configurable calculating unit further comprises a register configuration unit formed to configure the calculating unit into a long mode or a short mode, wherein the configurable calculating unit in the long mode comprises a certain first number of long registers, wherein the configurable calculating unit in the short mode comprises a second number of short registers, wherein the second number is larger than the first number, and wherein a length of a short register is such that a portion of the multiplicand is storable in the short register.

21. The device of claim 13,
formed to perform the modular multiplication within a cryptographic calculation, wherein the multiplier, the multiplicand and the modulus are parameters of the cryptographic calculation.

22. The device of claim 21,
wherein the cryptographic calculation is an encryption, a decryption, a signature generation or a signature verification.

23. The device of claim 13,
wherein all portions of the multiplicand comprise the same number of digits.

24. The device of claim 13,
wherein the calculator is formed to perform only a multiplication of numbers of a length less than or equal to the number of digits in a portion.

25. A method for calculating a result of a multiplication addition operation between a first operand, a second operand, a third operand and a fourth operand, comprising:
calculating, by a calculator, results of a plurality of Mult-Mod-Div- (MMD-) operations using the second operand, using portions of the first operand and using the fourth operand as a modulus to obtain the result of the multiplication addition operation, wherein each Mult-Mod-Div-operation of the plurality of Mult-Mod-Div-operations is configured:
to receive, as an input, the fourth operand, a corresponding portion of the first operand and the second operand,
to output, as a first result, a result of an integer division of a product of the corresponding portion of the first operand and the second operand by the fourth operand, and
to output, as a second result, a result of a modular reduction of the product of the corresponding portion of the first operand and the second operand, where the fourth operand is a modulus of the modular reduction, and,
and
wherein the first and third operands are longer than the second operand or the fourth operand, and wherein the portions of the first operand are equal to or shorter than the fourth operand.

26. The method of claim 25, wherein the step of calculating comprises:
calculating results of an MMD operation using the second operand, a more significant portion of the first operand and the fourth operand as modulus;
further comprising:
storing a DIV result in a first auxiliary register and an MOD result in a second auxiliary register;
wherein the step of calculating further comprises:
updating the DIV result and the MOD result using an addition of at least one portion of the third operand,
further comprising:
storing updated results in a fourth result register and a third result register; and
wherein the step of calculating further comprises:
executing again the MMD operation and the updating using another portion of the first operand, until all portions of the first operand are processed, wherein result registers in which updated results of an MMD operation are stored and a register in which an MOD result of a last MMD operation is stored together represent the result.

27. A method for calculating a result of a modular multiplication with a multiplier, a multiplicand and a modulus, comprising:

providing, by a unit for providing, the multiplicand in at least three portions, wherein each portion comprises a number of digits less than half the number of digits of the multiplicand, and wherein the at least three portions include all digits of the multiplicand;
calculating, by a sequential calculator, a first intermediate result using a more significant portion of the multiplicand,
calculating, by the sequential calculator, a second intermediate result using a less significant portion of the multiplicand and the first intermediate result, and
calculating, by the sequential calculator, a third intermediate result using a still less significant portion of the multiplicand and the second intermediate result and storing the third intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions,
wherein, in each step of calculating, a method for calculating the result of a multiplication addition operation between a first operand, a second operand, a third operand and a fourth operand, is executed, wherein the first and third operands are longer than the second operand or the fourth operand, and wherein portions of the first operand are equal to or shorter than the fourth operand, the method for calculating comprising:
calculating results of Mult-Mod-Div- (MMD-) operations using the second operand, using the portions of the first operand and using the fourth operand as a modulus to obtain the result of the multiplication addition operation, wherein Mult indicates a multiplication, Mod indicates a modular reduction and Div indicates an integer division, wherein each Mult-Mod-Div-operation of the plurality of Mult-Mod-Div-operations is configured:
to receive, as an input, the fourth operand, a corresponding portion of the first operand and the second operand,
to output, as a first result, a result of an integer division of a product of the corresponding portion of the first operand and the second operand by the fourth operand, and
to output, as a second result, a result of a modular reduction of the product of the corresponding portion of the first operand and the second operand, where the fourth operand is a modulus of the modular reduction, and
wherein the first operand corresponds to the multiplier, wherein the second operand is the portion of the multiplicand, wherein the third operand is an intermediate result of a sequential calculation previous in time, and wherein the fourth operand is derived from the number of digits that a portion comprises.

28. A non-transitory storage medium having a computer program with a program code for performing the method for calculating a result of a multiplication addition operation between a first operand, a second operand, a third operand and a fourth operand, wherein the first and third operands are longer than the second operand or the fourth operand, and wherein portions of the first operand are equal to or shorter than the fourth operand, the method comprising:
calculating results of Mult-Mod-Div- (MMD-) operations using the second operand, using the portions of the first operand and using the fourth operand as a modulus to obtain the result of the multiplication addition operation, wherein each Mult-Mod-Div-operation of the plurality of Mult-Mod-Div-operations is configured:
to receive, as an input, the fourth operand, a corresponding portion of the first operand and the second operand,
to output, as a first result, a result of an integer division of a product of the corresponding portion of the first operand and the second operand by the fourth operand, and
to output, as a second result, a result of a modular reduction of the product of the corresponding portion of the first operand and the second operand, where the fourth operand is a modulus of the modular reduction.

29. A non transitory storage medium having stored thereon a computer program with program code for performing the method for calculating a result of a modular multiplication with a multiplier, a multiplicand and a modulus, the method comprising:
providing the multiplicand in at least three portions, wherein each portion comprises a number of digits less than half the number of digits of the multiplicand, and wherein the at least three portions include all digits of the multiplicand;
calculating a first intermediate result using a more significant portion of the multiplicand;
calculating a second intermediate result using a less significant portion of the multiplicand and the first intermediate result; and
calculating a third intermediate result using a still less significant portion of the multiplicand and the second intermediate result and storing the third intermediate result,
wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions,
wherein, in each step of calculating, a method for calculating the result of a multiplication addition operation between a first operand, a second operand, a third operand and a fourth operand, is executed, wherein the first and third operands are longer than the second operand or the fourth operand, and wherein portions of the first operand are equal to or shorter than the fourth operand, the method for calculating comprising:
calculating results of Mult-Mod-Div- (MMD-) operations using the second operand, using the portions of the first operand and using the fourth operand as a modulus to obtain the result of the multiplication addition operation, wherein each Mult-Mod-Div-operation of the plurality of Mult-Mod-Div-operations is configured:
to receive, as an input, the fourth operand, a corresponding portion of the first operand and the second operand,
to output, as a first result, a result of an integer division of a product of the corresponding portion of the first operand and the second operand by the fourth operand, and
to output, as a second result, a result of a modular reduction of the product of the corresponding portion of the first operand and the second operand, where the fourth operand is a modulus of the modular reduction, and,
wherein the first operand corresponds to the multiplier, wherein the second operand is the portion of the multiplicand, wherein the third operand C is an intermediate result of a sequential calculation previous in time, and wherein the fourth operand is derived from the number of digits that a portion comprises.

30. A device for calculating a result of a multiplication addition operation between a first operand, a second operand, a third operand and a fourth operand, comprising:
means for receiving the first operand, the second operand, the third operand and the fourth operand; and
means for calculating results of Multi-Mod-Div- (MMD-) operations using the second operand, using portions of the first operand and using the fourth operand as a modulus to obtain the result of the multiplication addition operation, wherein each Mult-Mod-Div-operation of the plurality of Mult-Mod-Div-operations is configured:
to receive, as an input, the fourth operand, a corresponding portion of the first operand and the second operand,
to output, as a first result, a result of an integer division of a product of the corresponding portion of the first operand and the second operand by the fourth operand, and
to output, as a second result, a result of a modular reduction of the product of the corresponding portion of the first operand and the second operand, where the fourth operand is a modulus of the modular reduction, and
wherein the first and third operands are longer than the second operand or the fourth operand, and wherein the portions of the first operand are equal to or shorter than the fourth operand,
wherein at least one of the group consisting of the means for receiving and the means for calculating comprises a hardware implementation.

31. A device for calculating a result of a multiplication addition operation between a first operand, a second operand, a third operand and a fourth operand, comprising: a calculator configured for calculating results of Mult-Mod-Div- (MMD-) operations using the second operand, using portions of the first operand and using the fourth operand as a modulus to obtain the result of the multiplication addition operation,
wherein Mult indicates a multiplication, Mod indicates a modular reduction and Div indicates an integer division,
wherein the first and third operands are longer than the second operand or the fourth operand, and wherein the portions of the first operand are equal to or shorter than the fourth operand,
wherein the calculator is formed to execute the multiplication addition operation as follows:

$$\begin{aligned}
&\text{input: } A \in [0, N[ \\
&\qquad B_i \in [0, Z[ \\
&\qquad C \in [-N, 0] \\
&\text{output: } D := A \cdot B_i + C \cdot Z \in [-NZ, NZ[ \\
&(D_3|D_2|D_1|D_0)_z := (C_2|C_1|C_0|0)_z \\
&\text{for } j := 2 \text{ to } 0 \text{ execute} \\
&\qquad ((BA_{ij})_1, (BA_{ij})_0) := \text{MMD } (B_i, A_j; Z) \\
&\qquad D_j := D_j + (BA_{ij})_0 \\
&\qquad D_{j+1} := D_{j+1} + (BA_{ij})_1 \\
&\qquad \text{treat carry:} \\
&\qquad\qquad \text{if } D_j \geq Z \text{ then [only for } j = 1, 2] \\
&\qquad\qquad\qquad D_j := D_j - Z \\
&\qquad\qquad\qquad D_{j+1} := D_{j+1} + 1 \\
&\qquad\qquad \text{end} \\
&\qquad\qquad \text{if } D_{j+1} \geq Z \text{ then [only for } j = 0, 1] \\
&\qquad\qquad\qquad D_{j+1} := D_{j+1} - Z \\
&\qquad\qquad\qquad D_{j+2} := D_{j+2} + 1 \\
&\qquad\qquad \text{end} \\
&\text{end}
\end{aligned}$$

return D,
wherein A is the multiplier, $B_i$ is a portion of the multiplicand, C is an intermediate result of a previous step, N is the modulus, $Z=2^i$, wherein i represents a number of digits of the portion, D is a result of the multiplication addition, i and j are running indices, MMD represents a MultModDiv operation, and treat carry is a carry treatment function, and wherein the calculator corn rises a hardware implementation.

32. A method for calculating a result of a multiplication addition operation between a first operand, a second operand, a third operand and a fourth operand, comprising:

calculating, by a calculator, results of Mult-Mod-Div- (MMD-) operations using the second operand, using portions of the first operand and using the fourth operand as a modulus to obtain the result of the multiplication addition operation, wherein Mult indicates a multiplication, Mod indicates a modular reduction and Div indicates an integer division, wherein the first and third operands are longer than the second operand or the fourth operand, and wherein the portions of the first operand are equal to or shorter than the fourth operand, wherein the calculator is formed to execute the multiplication addition operation as follows:

```
input: A ∈ [0, N[
       B_i ∈ [0, Z[
       C ∈ [-N, 0]
output: D := A · B_i + C · Z ∈ [-NZ, NZ[
        (D_3|D_2|D_1|D_0)_z := (C_2|C_1|C_0|0)_z
for j := 2 to 0 execute
    ((BA_ij)_1, (BA_ij)_0) := MMD (B_i, A_j; Z)
    D_j := D_j + (BA_ij)_0
    D_{j+1} := D_{j+1} + (BA_ij)_1
    treat carry:
        if D_j ≧ Z then [only for j = 1, 2]
            D_j := D_j - Z
            D_{j+1} := D_{j+1} + 1
        end
        if D_{j+1} ≧ Z then [only for j = 0, 1]
            D_{j+1} := D_{j+1} - Z
            D_{j+2} := D_{j+2} + 1
        end
end
``` return D, wherein A is the multiplier, $B_i$ is a portion of the multiplicand, C is an intermediate result of a previous step, N is the modulus, $Z=2^i$, wherein i represents a number of digits of the portion, D is a result of the multiplication addition, i and j are running indices, MMD represents a MultModDiv operation, and treat carry is a carry treatment function, and wherein the calculator comprises a hardware implementation.

33. A non-transitory storage medium having a computer program with a program code for performing the method for calculating a result of a multiplication addition operation between a first operand, a second operand, a third operand and a fourth operand, wherein the first and third operands are longer than the second operand or the fourth operand, and wherein portions of the first operand are equal to or shorter than the fourth operand, the method comprising:

calculating results of Mult-Mod-Div- (MMD-) operations using the second operand, using the portions of the first operand and using the fourth operand as a modulus to obtain the result of the multiplication addition operation, wherein Mult indicates a multiplication, Mod indicates a modular reduction and Div indicates an integer division, wherein the multiplication addition operation is performed as follows:

```
input: A ∈ [0, N[
       B_i ∈ [0, Z[
       C ∈ [-N, 0]
output: D := A · B_i + C · Z ∈ [-NZ, NZ[
        (D_3|D_2|D_1|D_0)_z := (C_2|C_1|C_0|0)_z
for j := 2 to 0 execute
    ((BA_ij)_1, (BA_ij)_0) := MMD (B_i, A_j; Z)
    D_j := D_j + (BA_ij)_0
    D_{j+1} := D_{j+1} + (BA_ij)_1
    treat carry:
        if D_j ≧ Z then [only for j = 1, 2]
            D_j := D_j - Z
            D_{j+1} := D_{j+1} + 1
        end
        if D_{j+1} ≧ Z then [only for j = 0, 1]
            D_{j+1} := D_{j+1} - Z
            D_{j+2} := D_{j+2} + 1
        end
end
``` return D, wherein A is the multiplier, $B_i$ is a portion of the multiplicand, C is an intermediate result of a previous step, N is the modulus, $Z=2^i$, wherein i represents a number of digits of the portion, D is a result of the multiplication addition, i and j are running indices, MMD represents a MultModDiv operation, and treat carry is a carry treatment function.

34. A device for calculating a result of a modular multiplication with a multiplier, a multiplicand and a modulus, comprising:

a unit for providing the multiplicand in at least three portions, wherein each portion comprises a number of digits less than half the number of digits of the multiplicand, and wherein the at least three portions include all digits of the multiplicand; and a sequential calculator, wherein the sequential calculator is formed to calculate a first intermediate result using a more significant portion of the multiplicand, to calculate a second intermediate result using a less significant portion of the multiplicand and the first intermediate result, and to calculate and store a third intermediate result using a still less significant portion of the multiplicand and the second intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions, wherein the sequential calculator comprises a device for calculating a result of a multiplication addition operation between a first operand, a second operand, a third operand and a fourth operand, wherein the first and third operands are longer than the second operand or the fourth operand, and wherein portions of the first operand are equal to or shorter than the fourth operand, the device for calculating comprising:

a calculator configured for calculating results of Mult-Mod-Div- (MMD-) operations using the second operand, using the portions of the first operand and using the fourth operand as a modulus to obtain the result of the multiplication addition operation, wherein Mult indicates a multiplication, Mod indicates a modular reduction and Div indicates an integer division, and wherein the first operand corresponds to the multiplier, the second operand is the portion of the multiplicand, the third operand is an intermediate result of a sequential calculation previous in time, and the fourth operand is derived from the number of digits that a portion comprises, wherein the sequential calculator is formed to execute the following equation:

$$C = [(A \cdot B_2 \bmod N) \cdot Z + A \cdot B_1 \bmod N] \cdot Z + A \cdot B_0 \bmod N,$$

wherein C is the third intermediate result, A is the multiplier, $Z=2^i$, wherein i is a number of digits of the portions, $B_2$ is the most significant portion of the multiplicand, $B_1$ is a less significant portion of the multiplicand, $B_0$ is the least significant portion of the multiplicand, N is the modulus, and mod indicates a modular reduction operation, and wherein at least one of the group consisting of the unit, the sequential calculator and the calculator comprises a hardware implementation.

35. A method for calculating a result of a modular multiplication with a multiplier, a multiplicand and a modulus, comprising:

providing, by a unit for providing, the multiplicand in at least three portions, wherein each portion comprises a number of digits less than half the number of digits of the multiplicand, and wherein the at least three portions include all digits of the multiplicand;

calculating, by a sequential calculator, a first intermediate result using a more significant portion of the multiplicand;

calculating, by the sequential calculator, a second intermediate result using a less significant portion of the multiplicand and the first intermediate result; and calculating, by the sequential calculator, a third intermediate result using a still less significant portion of the multiplicand and the second intermediate result and storing the third intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions, wherein, in each step of calculating, a method for calculating the result of a multiplication addition operation between a first operand, a second operand, a third operand and a fourth operand, is executed, wherein the first and third operands are longer than the second operand or the fourth operand, and wherein portions of the first operand are equal to or shorter than the fourth operand, the method for calculating comprising:

calculating results of Mult-Mod-Div- (MMD-) operations using the second operand, using the portions of the first operand and using the fourth operand as a modulus to obtain the result of the multiplication addition operation, wherein Mult indicates a multiplication, Mod indicates a modular reduction and Div indicates an integer division, wherein the first operand corresponds to the multiplier, wherein the second operand is the portion of the multiplicand, wherein the third operand is an intermediate result of a sequential calculation previous in time, and wherein the fourth operand is derived from the number of digits that a portion comprises, wherein the sequential calculator is formed to execute the following equation:

$$C = [(A \cdot B_2 \bmod N) \cdot Z + A \cdot B_1 \bmod N] \cdot Z + A \cdot B_0 \bmod N,$$

wherein C is the third intermediate result, A is the multiplier, $Z=2^i$, wherein i is a number of digits of the portions, $B_2$ is the most significant portion of the multiplicand, $B_1$ is a less significant portion of the multiplicand, $B_0$ is the least significant portion of the multiplicand, N is the modulus, and mod indicates a modular reduction operation, and wherein the unit for providing or the sequential calculator comprises a hardware implementation.

36. A non transitory storage medium having stored thereon a computer program with a program code for performing the method for calculating a result of a modular multiplication with a multiplier, a multiplicand and a modulus, the method comprising:

providing the multiplicand in at least three portions, wherein each portion comprises a number of digits less than half the number of digits of the multiplicand, and wherein the at least three portions include all digits of the multiplicand;

calculating a first intermediate result using a more significant portion of the multiplicand;

calculating a second intermediate result using a less significant portion of the multiplicand and the first intermediate result; and calculating a third intermediate result using a still less significant portion of the multiplicand and the second intermediate result and storing the third intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions, wherein, in each step of calculating, a method for calculating the result of a multiplication addition operation between a first operand, a second operand, a third operand and a fourth operand, is executed, wherein the first and third operands are longer than the second operand or the fourth operand, and wherein portions of the first operand are equal to or shorter than the fourth operand, the method for calculating comprising:

calculating results of Mult-Mod-Div- (MMD-) operations using the second operand, using the portions of the first operand and using the fourth operand as a modulus to obtain the result of the multiplication addition operation, wherein Mult indicates a multiplication, Mod indicates a modular reduction and Div indicates an integer division, wherein the first operand corresponds to the multiplier, wherein the second operand is the portion of the multiplicand, wherein the third operand C is an intermediate result of a sequential calculation previous in time, and wherein the fourth operand is derived from the number of digits that a portion comprises, wherein the calculating the first intermediate result, the second intermediate result, and the third intermediate result comprises executing the following equation:

$$C = [(A \cdot B_2 \bmod N) \cdot Z + A \cdot B_1 \bmod N] \cdot Z + A \cdot B_0 \bmod N,$$

wherein C is the third intermediate result, A is the multiplier, $Z=2^i$, wherein i is a number of digits of the portions, $B_2$ is the most significant portion of the multiplicand, $B_1$ is a less significant portion of the multiplicand, $B_0$ is the least significant portion of the multiplicand, N is the modulus, and mod indicates a modular reduction operation.

* * * * *